United States Patent

Imai et al.

[11] Patent Number: 5,864,800
[45] Date of Patent: Jan. 26, 1999

[54] METHODS AND APPARATUS FOR PROCESSING DIGITAL SIGNALS BY ALLOCATION OF SUBBAND SIGNALS AND RECORDING MEDIUM THEREFOR

[75] Inventors: Kenichi Imai, Tokyo; Mitsuru Hanajima, Saitama; Kenzo Akagiri, Kanagawa, all of Japan

[73] Assignee: Sony Corporation, Tokyo, Japan

[21] Appl. No.: 582,893

[22] Filed: Jan. 4, 1996

[30]     Foreign Application Priority Data

Jan. 5, 1995 [JP] Japan ................................. 7-000237

[51] Int. Cl.$^6$ .................................................. E10L 9/00
[52] U.S. Cl. .......................... 704/229; 704/212; 704/500
[58] Field of Search ................. 395/2.91, 2.21, 395/2.38, 2.39; 704/500, 501, 502, 503, 504, 212, 229, 230, 226, 205, 206, 203, 200, 201

[56]              References Cited

U.S. PATENT DOCUMENTS

| | | | |
|---|---|---|---|
| 5,151,941 | 9/1992 | Nishiguchi et al. | 381/46 |
| 5,204,677 | 4/1993 | Akagiri et al. | 341/118 |
| 5,264,846 | 11/1993 | Oikawa | 341/76 |
| 5,268,685 | 12/1993 | Fujiwara | 341/76 |
| 5,301,205 | 4/1994 | Tsutsui et al. | 375/1 |
| 5,311,561 | 5/1994 | Akagiri | 375/122 |
| 5,414,795 | 5/1995 | Tsutsui | 395/2.13 |
| 5,471,558 | 11/1995 | Tsutsui | 395/2.28 |
| 5,490,170 | 2/1996 | Akagiri et al. | 375/240 |
| 5,642,111 | 6/1997 | Akagiri | 341/50 |
| 5,664,056 | 9/1997 | Akagiri | 704/229 |
| 5,687,157 | 11/1997 | Imai et al. | 369/124 |

FOREIGN PATENT DOCUMENTS

| | | |
|---|---|---|
| 0458645 A2 | 11/1991 | European Pat. Off. .......... H04B 1/66 |
| 0 497 413A1 | 8/1992 | European Pat. Off. .......... H04B 1/66 |
| 0506394 A2 | 9/1992 | European Pat. Off. .......... G10L 7/00 |
| 0525809 A2 | 2/1993 | European Pat. Off. .......... H04B 1/66 |
| 0 570 131 A1 | 11/1993 | European Pat. Off. .......... H04B 1/66 |
| 0 615 349 A2 | 9/1994 | European Pat. Off. .......... H04B 1/66 |
| WO 90/09022 | 8/1990 | WIPO ............................. G11B 20/10 |

OTHER PUBLICATIONS

R.E. Crochiere et al., "Digital Coding of Speech in Sub–Bands," The Bell System Technical Journal, vol. 55, No. 8, Oct. 1976, pp. 1069–1085.

J. Rothweiler, "Polyphase Quadrature Filters—A New Subband Coding Technique," ICASSP Apr. 14–16, 1983, vol. 3 of 3, pp. 1280–1283.

M. Smith et al., "Exact Reconstruction Techniques for Tree–Structured Subband Coders," IEEE Transactions on Acoustics, Speech & Signal Processing, vol. ASSP–34, No. 3, Jun. 1986, pp. 434–441.

J. Princen et al., "Subband/Transform Coding Using Filter Bank Designs Based on Time Domain Aliasing Cancellation," ICASSP Apr. 6–9, 1987, IEEE, vol. 4, pp. 2161–2164.

B. Atal et al., "Predictive Coding of Speech Signals," Reports of the 6th Int'l Congress On Acoustics, Aug. 21–28, 1968, Tokyo, pp. C13–C16.

F. Jelinek, "Buffer Overflow in Variable Length Coding of Fixed Rate Sources," IEEE Transactions on Information Theory, vol. It–14, No. 3, May 1968, pp. 490–501.

(List continued on next page.)

*Primary Examiner*—Richemond Dorvil
*Attorney, Agent, or Firm*—Limbach & Limbach LLP

[57]                ABSTRACT

A digital signal processing method and apparatus processes a signal obtained on splitting the entire frequency band of an input digital signal into a plurality of sub-bands. The entire frequency band of the input digital signal is split into a plurality of sub-bands, and signals of each sub-band are allocated to a plurality of sub-words divided from a word of the input digital signal. In allocating the signals, the information for reducing the noise in at least one of the sub-bands is allocated to the sub-word different from the sub-word to which is allocated the signal of the sub-band whose noise is to be reduced.

35 Claims, 31 Drawing Sheets

OTHER PUBLICATIONS

D. Huffman, "A Method for the Construction of Minimum–Redundancy Codes," Proceedings of the I.R.E., vol. 40, No. 2, Feb. 1952, pp. 1098–1101.

J. Ziv et al., "A Universal Algorithm for Sequential Data Compression," IEEE Transactions of Information Theory, vol. IT–23, No. 3, May 1977, pp. 337–343.

P. Vaidyanathan, "Multirate Digital Filters, Filter Banks, Polyphase Networks, and Applications: A Tutorial," Proceedings of the IEEE, vol. 78, No. 1, Jan. 1990, pp. 56–93.

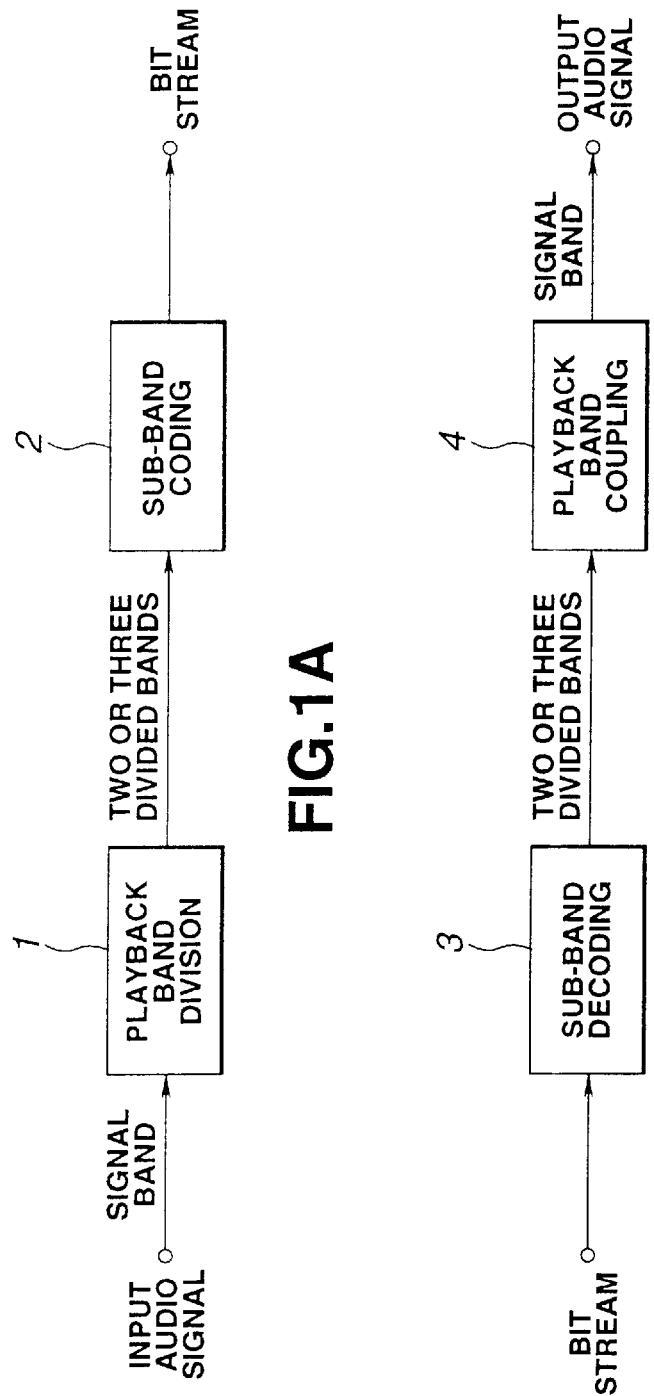

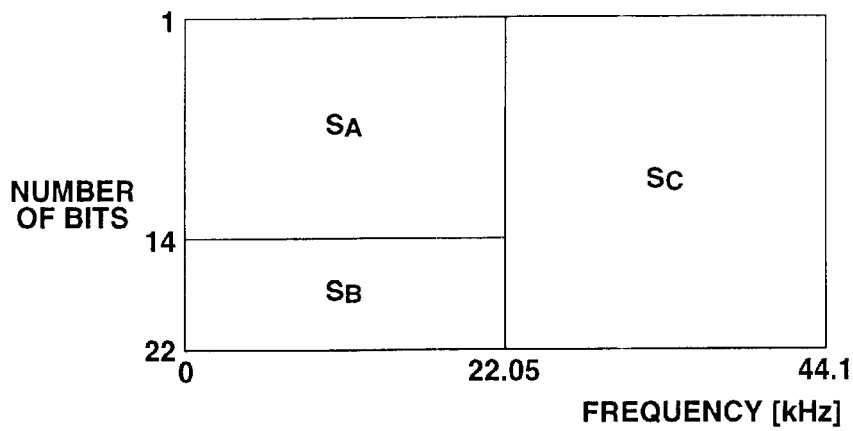
FIG.2A
PLAYBACK BANDS WITH SAMPLING FREQUENCY OF 88.2kHz AND NUMBER OF QUANTIZATION BITS OF 22
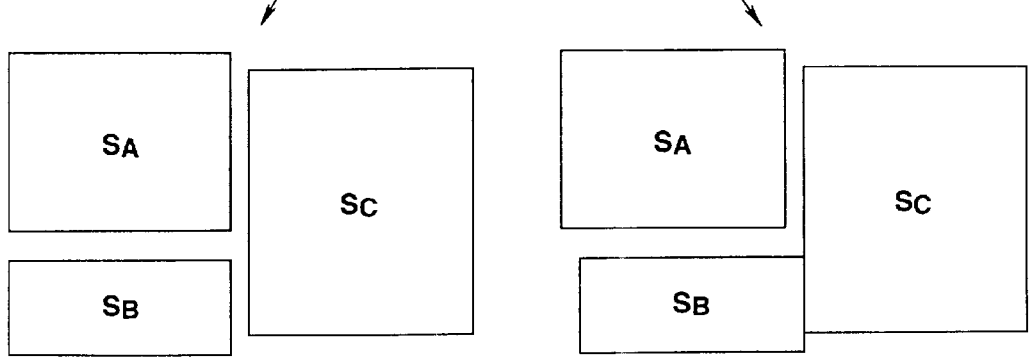
DIVIDE INTO $S_A$, $S_B$ AND $S_C$ AND ALLOCATE SUB-WORDS TO THEM
FIG.2B
COMBINE $S_B$ AND $S_C$ AND INTO ONE AND ALLOCATE ONE SUB-WORD TO IT
FIG.2C

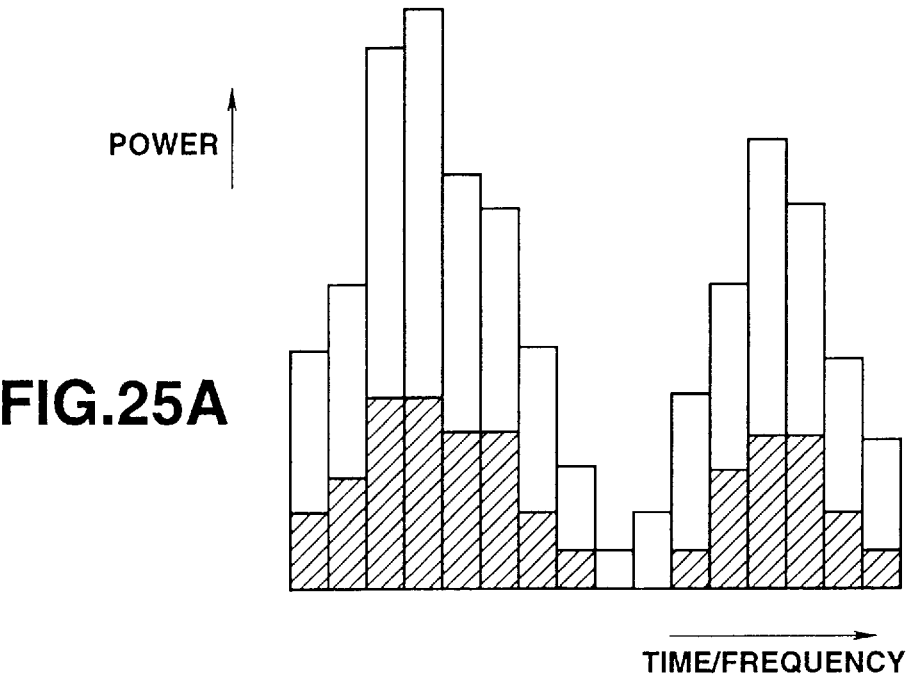
FIG.25A
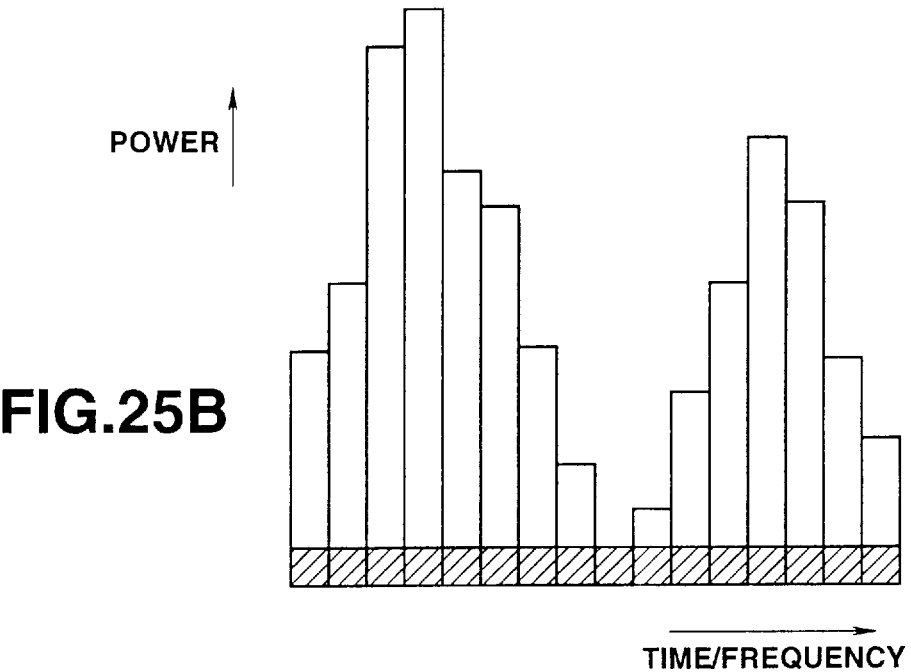
FIG.25B
 STRAIGHT PCM WORD (LOW RANGE)
 CODED DATA WORD (HIGH RANGE)
 ORIGINAL STRAIGHT PCM WORD (LOW RANGE)

METHODS AND APPARATUS FOR PROCESSING DIGITAL SIGNALS BY ALLOCATION OF SUBBAND SIGNALS AND RECORDING MEDIUM THEREFOR

BACKGROUND OF THE INVENTION

1. Field of the Invention

This invention relates to a method and apparatus for processing digital signals over a wide frequency range, such as digital audio signals, a method for transmitting digital signals, and a recording medium. More particularly, it relates to a method and apparatus for processing digital signals, a method for transmitting digital signals, and a recording medium, in which the frequency spectrum is divided into plural bands for a lower range one of which and for a higher range one of which straight PCM and high-efficiency encoding are applied, respectively.

2. Description of Related Art

Recently, recording/reproduction of digital audio signals is employed extensively. In particular, standards for a compact disc (CD) or a digital audio tape recorder (DAT) have become widespread as typical standards for recording/reproduction of digital audio signals.

As for these standards for digital audio signals, since the sampling frequency for the compact disc is prescribed at 44.1 kHz, the maximum reproducing frequency is 22.05 kHz. On the other hand, since the sampling frequency for a digital audio tape recorder (DAT) is prescribed at 32 kHz, 44.1 kHz and 48 kHz, the maximum reproducing frequency is 16 kHz, 22.05 kHz and 24 kHz, respectively.

Meanwhile, in the case of a sound source of folk music, such as gamran or yodel voice, there are contained significant amounts of frequency components exceeding the above-mentioned maximum reproducing frequency. Thus the above-mentioned sampling frequency of 44.1 kHz or 48 kHz is no longer sufficient insofar as the above-given folk music is concerned.

On the other hand, a digital/analog (D/A) converter has recently been improved in precision and has become able to handle signals of weaker strength. Thus the dynamic range on the order of 98 dB, obtained with the number of quantization bits for the CD, has become no longer sufficient.

For combatting this problem, it may be contemplated to record signals improved in sound quality by increasing the sampling frequency or the number of quantization bits, that is the signals of broader bands or broader dynamic ranges, on a disc (recording medium) having the same size as the conventional CD.

From the technical viewpoint, the signals improved in sound quality by increasing the sampling frequency or the number of quantization bits can be recorded on the disc (recording medium) of the conventional size (recording capacity) by reducing the track pitch of the disc or the laser light wavelength of the optical pickup. However, if the device configuration is modified for increasing the recording capacity, it becomes impossible to maintain interchangeability with the conventional recording media, while confusion is produced in the software market.

For recording/reproducing the sound having the sampling frequency exceeding the maximum reproducing frequency without modifying the device or formats of the standards for conventional digital audio signals, that is without impairing compatibility with the conventional standards, it may be contemplated to provide such a signal processing method, recording/reproducing device or a recording medium in which the reproducing band for the CD is encoded with straight PCM and higher bands are encoded using high efficiency encoding, thereby recording the signals n the usual recording frequency range for the compact disc. With such method or device, the usual PCM word is divided, for recording the signals in the usual recording range for the compact disc, so that the usual reproducing range is encoded with straight PCM and higher bands are encoded using high efficiency encoding. The encoded signals are recorded on the compact disc.

In this case, the PCM word employed for the conventional reproducing range becomes naturally shorter in length than the conventional PCM word, so that the quantization noise is produced, thereby deteriorating the sound quality.

In addition, when the usual reproducing range and the higher range are encoded with straight PCM and with high-efficiency coding, respectively, and the encoded signals are recorded on the compact disc, there is raised a problem as to how the usual PCM word is to be divided. That is, if the frequency spectrum of the digital audio signals is divided as described above, some bands have allowance in recording capacity, while others do not, in dependence upon signals, such that, in the bands devoid of allowance in recording capacity, the quantization noise becomes outstanding because the number of quantization bits or the sub-word length is diminished for compensating for scarcity in the recording capacity.

OBJECT AND SUMMARY OF THE INVENTION

It is therefore an object of the recording capacity to provide a digital signal processing method and apparatus, a digital signal decoding method and apparatus and a recording medium whereby generation of the quantization noise may be suppressed in a band configured for recording straight PCM data.

It is a specific object of the present invention to provide a signal processing method and apparatus in which a usual straight PCM word is divided and the conventional band is recorded with straight PCM data with a shorter word length for reducing the resulting quantization noise. The signal processing method and apparatus herein contemplated are such method and apparatus in which the frequency spectrum of digital signals, such as broad band audio PCM signals, is divided into at least two sub-bands, using a band-splitting filter, such as QMF, or a low-pass filter (LPF), signals of at least one sub-band from the lower range side are encoded with straight PCM, signals of at least one sub-band from the high range side are encoded with high efficiency encoding, such as entropy coding or non-linear quantization and in which the usual straight PCM word is divided so that the usual band is recorded by a shorter word length by the straight PCM, for reducing the quantization noise.

It is yet another object of the present invention to provide a digital signal processing method and apparatus and a recording medium capable of prohibiting the quantization noise from being locally apparent.

In one aspect, the present invention provides a digital signal processing method for processing a signal obtained on splitting the entire frequency band of an input digital signal into a plurality of sub-bands, including the steps of dividing the entire frequency band of the input digital signal into a plurality of sub-bands, and allocating signals of each sub-band to a plurality of sub-words divided from a word of the input digital signal. In the allocating step, the information for reducing the noise in at least one of the sub-bands is allocated to the sub-word different from the sub-word to which is allocated the signal of the sub-band whose noise is to be reduced. The recording medium according to the present invention is such a recording medium on which the signals have been recorded as described above.

As the information for reducing the quantization noise, a difference signal between straight PCM signals having the usual word length and the straight PCM signals with reduced word length may be employed. If a sub-word is allocated to this signal and recorded, the sound quality may be prohibited from becoming deteriorated due to the quantization noise. However, if the difference signal is recorded as such, the information volume is not changed from that in case the recording is done with the usual word length, so that signals in excess of the usual band cannot be recorded. Thus a region for recording signals in excess of the usual frequency range is maintained by taking out only signal components thought to produce sound quality deterioration by exploiting psychoacoustic characteristics of the human hearing mechanism. These signal components are recorded by being allocated to a sub-word distinct from the signal in excess of the usual reproducing range or by being combined with the signal in excess of the usual reproducing range. The signal components producing signal quality deterioration cannot be recorded within the usual recording capacity if in the form of straight PCM. Thus the signal components are recorded after compressing the information volume by e.g., high-efficiency encoding.

The above-described technique enables the noise of the band recorded by straight PCM to be perceptually reduced to realize the sound quality equivalent to that of the original PCM word.

In another aspect, the present invention provides a digital signal processing method for processing a signal obtained on splitting the entire frequency band of an input digital signal into a plurality of sub-bands, including the steps of forming a unit every plural words of the input digital signal, splitting the entire frequency of a signal from the unit forming step into a plurality of sub-bands from one unit to another, and allocating signals of at least one sub-band of each unit from the band splitting means to sub-words of plural units, or allocating signals of at least one sub-band in each of plural units to one sub-word.

BRIEF DESCRIPTION OF THE DRAWINGS

FIG. 1A is a schematic block diagram showing an arrangement of an encoder (recording side) embodying the present invention.

FIG. 1B is a schematic block diagram showing an arrangement of a decoder (reproducing side) embodying the present invention.

FIG. 2A is a diagrammatic view for illustrating division of the resolution and the reproducing frequency range of the input signal into three or two sub-bands.

FIG. 2B is a diagrammatic view for illustrating division of the resolution and the reproducing frequency range of the input signal into three sub-bands.

FIG. 2C is a diagrammatic view for illustrating division of the resolution and the reproducing frequency range of the input signal into two sub-bands.

FIG. 25A illustrates an illustrative example of word splitting in a time waveform and in the frequency spectrum.

FIG. 25B illustrates an illustrative example of word splitting in a time waveform and in the frequency spectrum.

DETAILED DESCRIPTION OF PREFERRED EMBODIMENTS

Figure 3A:
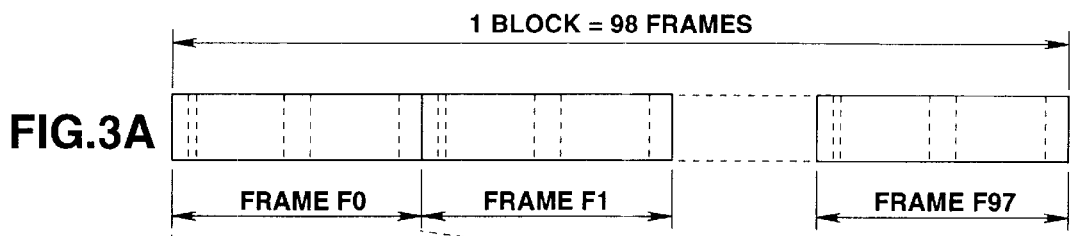
FIG. 3A is a diagrammatic view showing the constitution of a block in a CD data format.

Referring to the drawings, preferred embodiments of the present invention will be explained in detail.

FIGS. 1A and 1B illustrate a schematic constitution of a digital signal recording/reproducing system embodying the present invention. That is, FIG. 1A and FIG. 1B illustrate an encoder (recording side) and a decoder (reproducing side), respectively.

To an input terminal of the encoder (recording side) shown in FIG. 1A, digital signals, such as audio or acoustic signals, are entered. In the compact disc(CD), the sampling frequency is 44.1 kHz, with the reproducing frequency range being 22.05 kHz, while the number of quantization bits is 16. The recording/reproducing device embodying the present invention manages signals having the sampling frequency of 88.2 kHz, with the reproducing frequency band being 44.1 kHz, and with the number of quantization bits of 22. Since the signals have the volume of the information larger than that of the signals of the conventional CD, it is impossible to directly record straight PCM data. Thus, in accordance with the present invention, the input signal is divided into several regions or sub-bands for deriving managed signals, as shown for example in FIG. 2A.

Referring to FIG. 2A, the entire frequency range or the reproducing frequency range of the input signal or the managed signal is divided so that a region $S_A$ contains a signal component having the frequency range of 0 to 22.05 kHz and the number of quantization bits of 14, a region $S_B$ contains signal component having the frequency range of 0 to 22.05 kHz. The number of quantization bits equal to a difference between 22 and the number for the region $S_A$, and a region $S_C$ contains a signal component having the frequency range of 22.05 kHz to 44.1 kHz and the number of quantization bits of 22. In dividing the entire frequency range into bands $S_A$ and $S_B$, the number of quantization bits for the band $S_A$ may be set to e.g., 12 or 13, while the number of quantization bits for the band $S_B$ may be set so as to be equal to a difference between 22 and the number for the region As for the three regions $S_A$, $S_B$ and $S_C$, each of these regions may be a sub-region to which is allocated each sub-word derived by dividing 16 bits into three portions, as shown in FIG. 2B. Alternatively, the regions $S_B$ and $S_C$ may be combined into one region and the region $S_A$ is left to provide two regions to which are allocated two sub-words derived by dividing 16 bits into two portions, as shown in FIG. 3C.

Figure 3B:
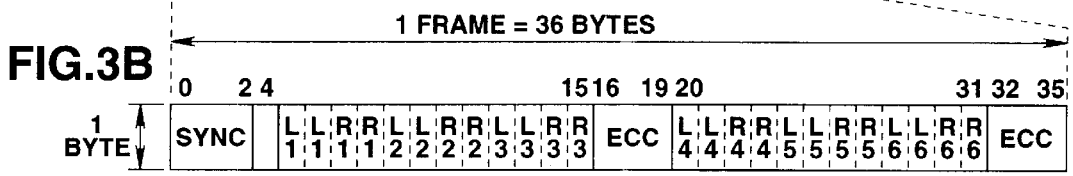
FIG. 3B is a diagrammatic view showing the constitution of a frame in a CD data format.
Figure 3C:
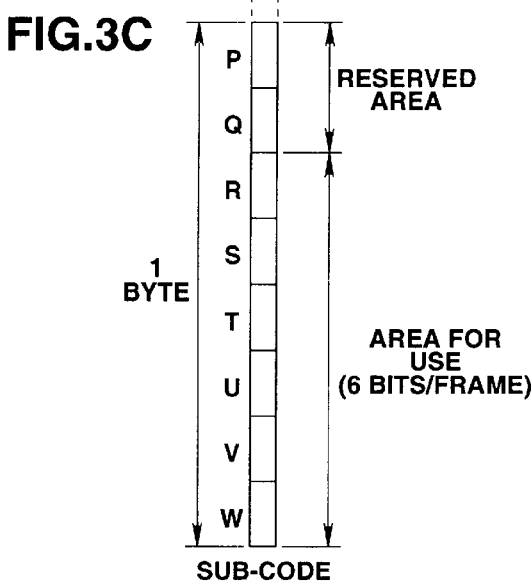
FIG. 3C is a diagrammatic view showing the constitution of a sub-code in a CD data format.

In a comp act disc (CD) format, each block is made up of frames F0 to F97, totalling 98 frames, as shown in FIG. 3A. Each frame is made up of a synchronization signal (SYNC), error correction codes (ECC) and left (L) and right (R) sound data, along with sub-codes, as shown in FIG. 3B. Also, as shown in FIG. 3C, each sub-code is made up of a reserved area of 2 bits and a use area of 6 bits. F or realizing the high-efficiency encoding required for recording the sub-region in a pre-set sub-word, or exploiting the psychoacoustic characteristics or filtering for splitting the reproducing frequency band as described above, it is necessary to input a larger number of samples. Plural blocks, such as 4 to 8 blocks, are entered as one unit, in consideration of ease in data reading and real-time reproduction.

This input signal first enters a reproducing band division unit 1 shown in FIG. 1A. The input signal is divided into three sub-bands corresponding to the above regions $S_A$, $S_B$ and $S_C$ or into two sub-regions $S_A$ and $S_B+S_C$. The latter division into two sub-regions will be explained in detail by referring to FIG. 4.

In this figure, the input signal of 0 to 44.1 kHz, obtained on sampling the input signal at an input terminal with the sampling frequency of 88.2 kHz, is sent to a band-splitting filter 5, such as a quadrature mirror filter (QMF) as later explained. The band-splitting filter 5 divides the frequency band into two equal portions and decimates the samples by one half. The input signal iS divided by the band-splitting filter 5, such as QMF, into a band (low-range band) of from 0 to 22.5 kHz, and a band (high-range band) of from 22.05 to 44.1 kHz. An output of the high-range band of 22.05 to 44.1 kHz is aliased to the low-rage band.

The technique of dividing the input digital signal into plural frequency bands is discussed in detail in R. E. Crochiere, "Digital Coding of Speech in Sub-bands", Bell Syst. Tech. J., Vol.55, No.8 1976. The band-splitting filter is discussed in Mark J. T. Smith and Thomas P. Barmwell, "Exact Reconstruction Techniques for Tree-Structured Sub-band Coders", IEEE Trans. ASSP, Vol. ASSP-34 No.3, June 1986, pp.434 to 441. In the present embodiment, a conjugate quadrature filter (CQF) or a method of filter division into equal bandwidth as discussed in Joseph H. Rothweiler ICASSP 83, BOSTON, may also be employed. With the CQF, the signal can be completely re-constructed using a non-linear phase filter. With the polyphase quadrature filter, the signal can be divided at a time into plural bands of equal bandwidth.

The high-range signal, obtained on band division by the band-splitting filter 5, is directly outputted by the reproducing band division unit 1 of FIG. 1A as the signal for the region $S_C$. The low-range signal is supplied to a noise-shaping circuit 7. The noise-shaping circuit 7 performs the role of reducing perceptual effects of the quantization noise generated on converting the input low-range signal into data of shorter word length, as later explained, in order that perceptual deterioration of the sound quality in case of recording, reproduction and transmission with a limited word length will be prohibited as much as possible. A typical noise-reducing technique of modifying the spectrum of the quantization noise in conformity to psychoacoustic characteristics is described in Akagiri et al., U.S. Pat. No. 5,204,667, issued Apr. 20, 1993.

Figure 4:
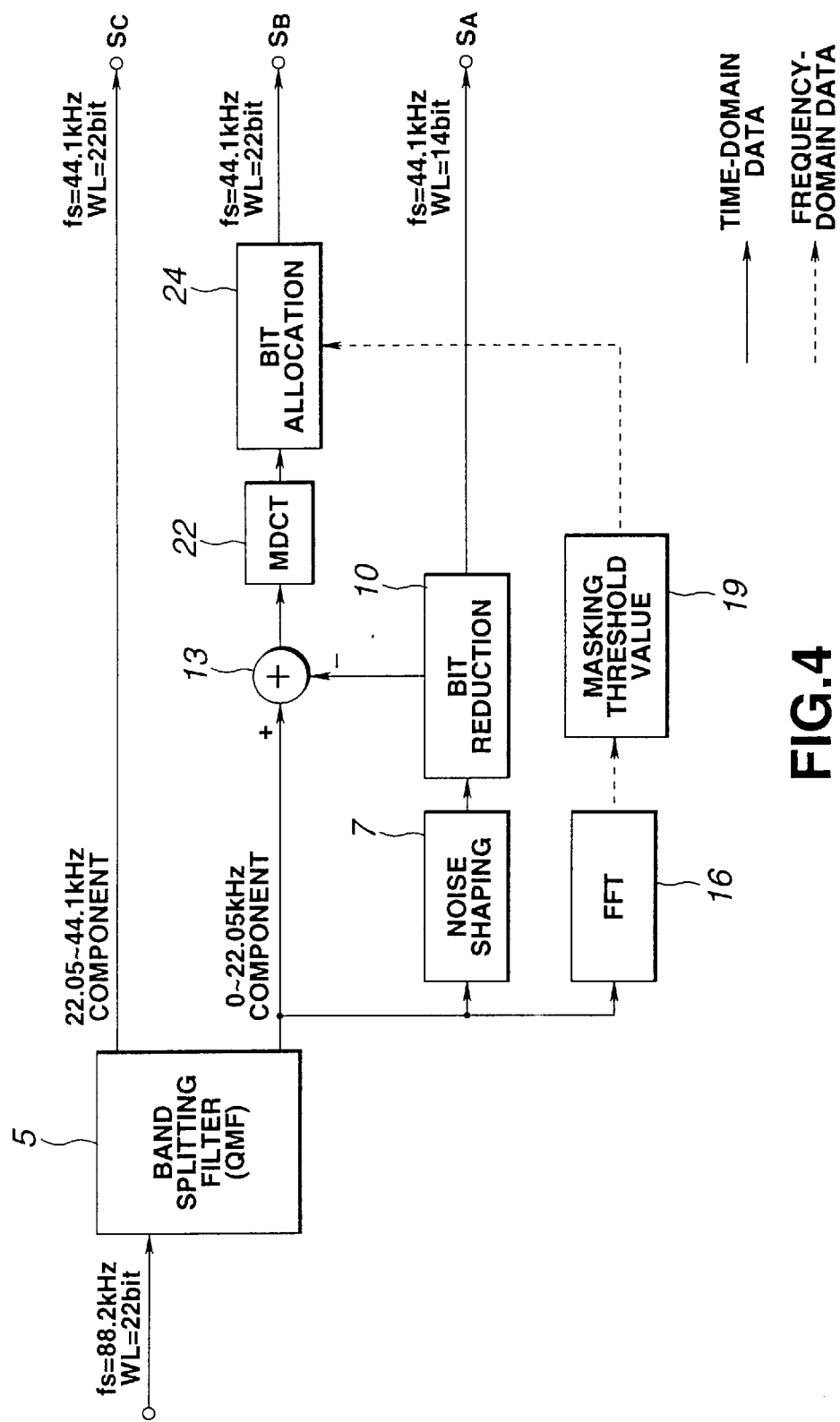
FIG. 4 is a block view showing an embodiment of a reproducing band splitting portion of the encoder (recording side) in case of splitting the entire frequency into three sub-bands.

Although noise shaping is performed in the embodiment of FIG. 4 after band splitting by the band-splitting filter 5, it is possible to perform noise shaping for the entire frequency prior to band splitting.

An output of the noise shaping circuit 7 enters a bit reduction circuit 10 which then converts the input data with the quantization number of bits of 22 into data on the order of 14 bits by rounding off or truncation. For converting 22-bit data into 14-bit data, it suffices to reduce the number of bits by 8 and hence to divide the data by 256. The resulting 14-bit data is outputted from the reproducing band dividing unit 1 of FIG. 1A as the signal of the sub-band of the region $S_A$.

The low-range signal from the band-splitting filter 5 also enters an adder 13 which then finds a difference between the data obtained by the band-splitting filter 5 and the data obtained by the bit reduction circuit 10. Since the data from the bit reduction circuit 10 is obtained by reducing the number of bits from 22 to 14, that is by 8, the sound quality is deteriorated in an amount corresponding to the difference. Thus a subcode is allocated to the difference and transmitted or recorded on the reproducing side to the low-range region. This difference is added on the reproducing side to the low-range region with the smaller number of bits for reducing the effect of the quantization noise resulting from reduction in the number of bits.

However, since the volume of the sub-word that may be allocated to the difference information as such is small, the information volume needs to be compressed in some way or other. If only the perceptually important information is taken out and only such information is recorded or transmitted, the information volume can be compressed efficiently. To this end, a low-range output of the band-splitting filter 5 is entered to a fast Fourier transform (FFT) circuit 16. The FFT circuit performs windowing, such as with a Hamming window, followed by FFT for transforming the time-domain waveform into spectral frequency-domain signals. Although FFT is in need of the number of data equal to powers of 2, the number of data is not necessarily equal to powers of 2 since plural blocks are employed as input data. Thus, in the FFT circuit 16 of the instant embodiment, "0" is allocated in deficit portions of the input data for calculation.

The spectral data obtained by the FFT circuit 16 enters a masking threshold value circuit 19 configured for calculating a masking threshold value as later explained. The masking threshold value circuit 19 splits the frequency spectrum as found by the FFT circuit 16 into critical bands for calculating the allowable noise volume for each critical band by taking the so-called masking effect into consideration. The critical bands mean the frequency bands divided from the audible frequency range in order to take into account psychoacoustic characteristics of the human aural sense. Thus, each critical band is the band of a narrow-band noise masking a pure tone having a frequency in the vicinity of the frequency of the noise and the same intensity as the noise. The critical bands become broader with increasing frequency. The audible frequency range of from 1 to 22 kHz is divided into, for example, 25 critical bands.

Figure 5:
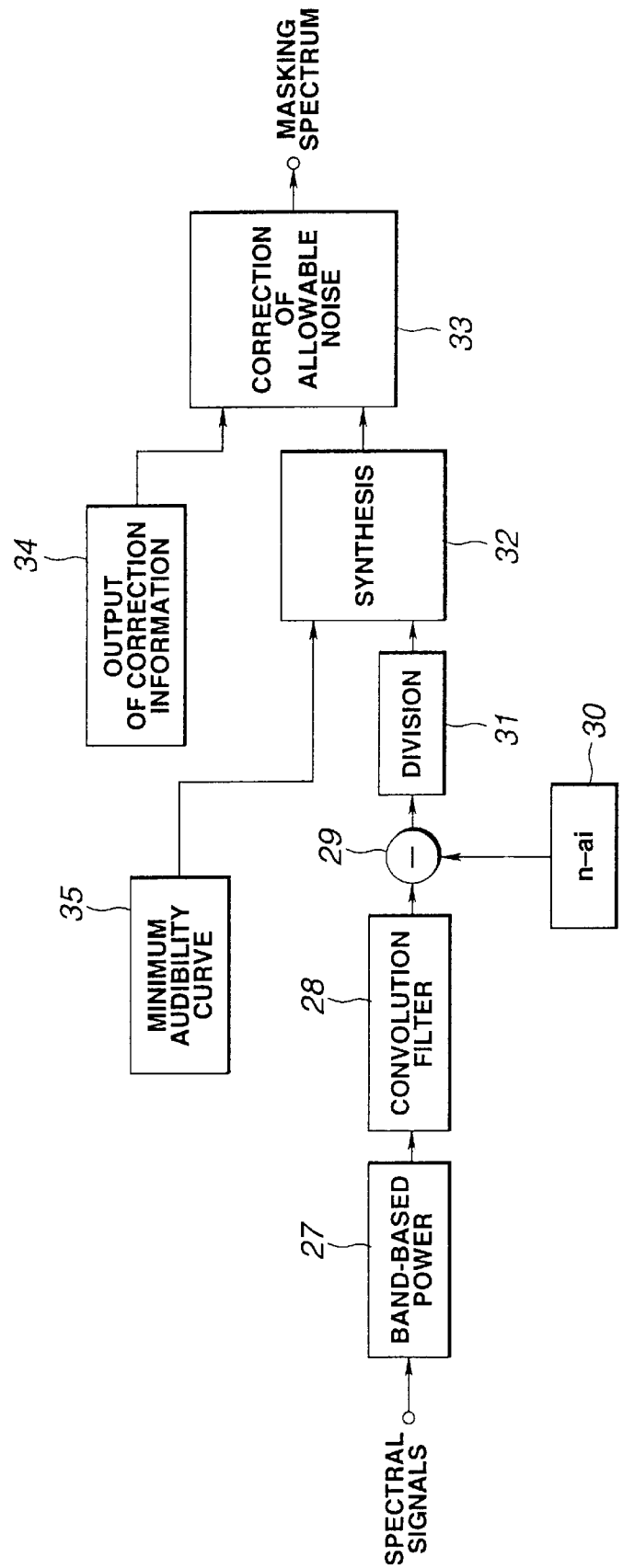
FIG. 5 is a block diagram showing an embodiment of a masking threshold value calculating circuit.

The construction of an embodiment of the masking threshold circuit 19 is now explained by referring to FIG. 5.

In this figure, frequency-domain spectral data from the fast Fourier transform (FFT) circuit 16 is supplied to an input terminal. The data employed in the masking threshold value circuit 19 is the amplitude data as found along with the phase value based upon the real-number component and the imaginary number component of the FFT coefficient data. The fact that the acoustic sense of the human being is sensitive to the amplitude (level or intensity) on the frequency domain while being rather dull to the phase is herein taken into account.

Figure 6:
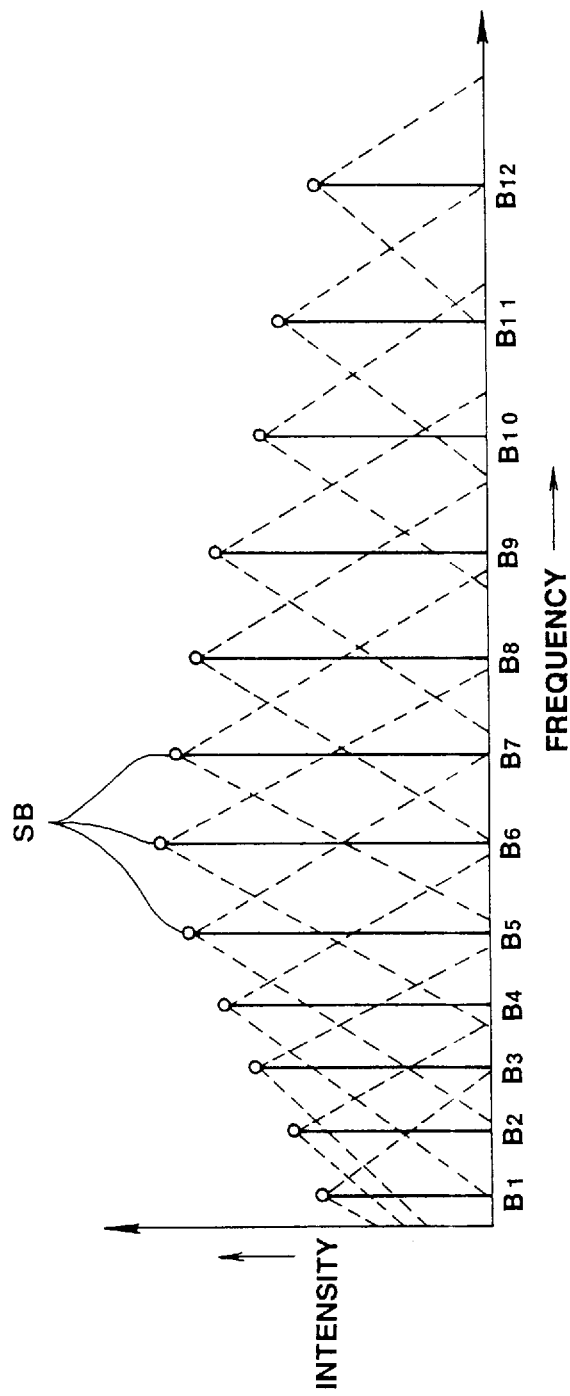
FIG. 6 is a graph showing the Bark spectrum for each critical band.

The input data on the frequency axis is sent to a circuit 27 configured for calculating the signal power from one critical band to another. The peak values or mean values of the signal amplitudes may also be employed in place of the band-based signal power. The spectrum of the band-based sums, as an output of the signal power calculating circuit 27, is generally termed the Bark spectrum. The Bark spectrum $S_B$ on the critical band basis is shown in FIG. 6, in which 12 critical bands B1 to B12 are shown for simplifying the drawing.

To this end, an output of the band-based energy calculating circuit 27, that is each value of the spectral component SB, is transmitted to a convolution filter circuit 28. The convolution filter circuit 28 is made up of a plurality of delay elements for sequentially delaying input data, a plurality of multipliers, such as 25 multipliers associated with the respective bands, for multiplying outputs of the delay elements with filter coefficients or weighting functions, and an adder for finding the sum of the outputs of the respective multipliers. By such convolution, the sum of the portions indicated by broken lines in FIG. 6 is found. The masking means the phenomenon in which certain signals are masked by other signals and become inaudible due to psychoacoustic characteristics of the human auditory system. The masking effect may be classified into the time-domain masking effect produced by the time-domain audio signals and concurrent masking effect produced by the frequency-domain signals. By this masking, any noise present in a masked portion becomes inaudible. In actual audio signals, the noise within the masked range is an allowable noise.

By way of an illustrative example of multiplication coefficients or filter coefficients of the respective filters of the convolution filter circuit 23, if the coefficient of a multiplier M for an arbitrary band is 1, outputs of the delay elements are multiplied by coefficients 0.15, 0.0019, 0.0000086, 0.4, 0.06 and 0.007 at the multipliers M−1, M−2, M−3, M+1, M+2 and M+3, M being an arbitrary integer of from 1 to 25, for performing convolution of the spectral components SB.

An output of the convolution filter circuit 28 is transmitted to a subtractor 29 which is employed for finding a level $\alpha$ corresponding to the allowable noise level in the convolved region. Meanwhile, the allowable noise level $\alpha$ is such a level which will give an allowable noise level for each of the critical bands by deconvolution as will be described subsequently. The subtractor 29 is supplied with an allowance function (a function representative of the masking level) for finding the level $\alpha$. The level $\alpha$ is controlled by increasing or decreasing the allowance function. The allowance function is supplied from a (N−ai) function generator 30 as will be explained subsequently.

That is, the level α corresponding to the allowable noise level is found from the equation (1):

$$\alpha = S(n-ai) \quad (1)$$

where i is the number accorded sequentially to the critical bands beginning from the lower side, n and a are constants where a>0 and S the intensity of the convolved Bark spectrum. In the equation (1), (n−ai) represents the allowance function. In the present embodiment, by setting so that n=38 and a=1, optimum encoding may be achieved without deterioration in the sound quality.

The level α is found in this manner and output data from the subtractor 29 is transmitted to a divider 31 for deconvolving the level α in the convolved region. By this deconvolution, the masking spectrum is found from the level α. This masking spectrum becomes the allowable noise level. Although the deconvolution necessitates complex operating steps, it is performed in the present embodiment in a simplified manner by using the divider 31.

Figure 7:
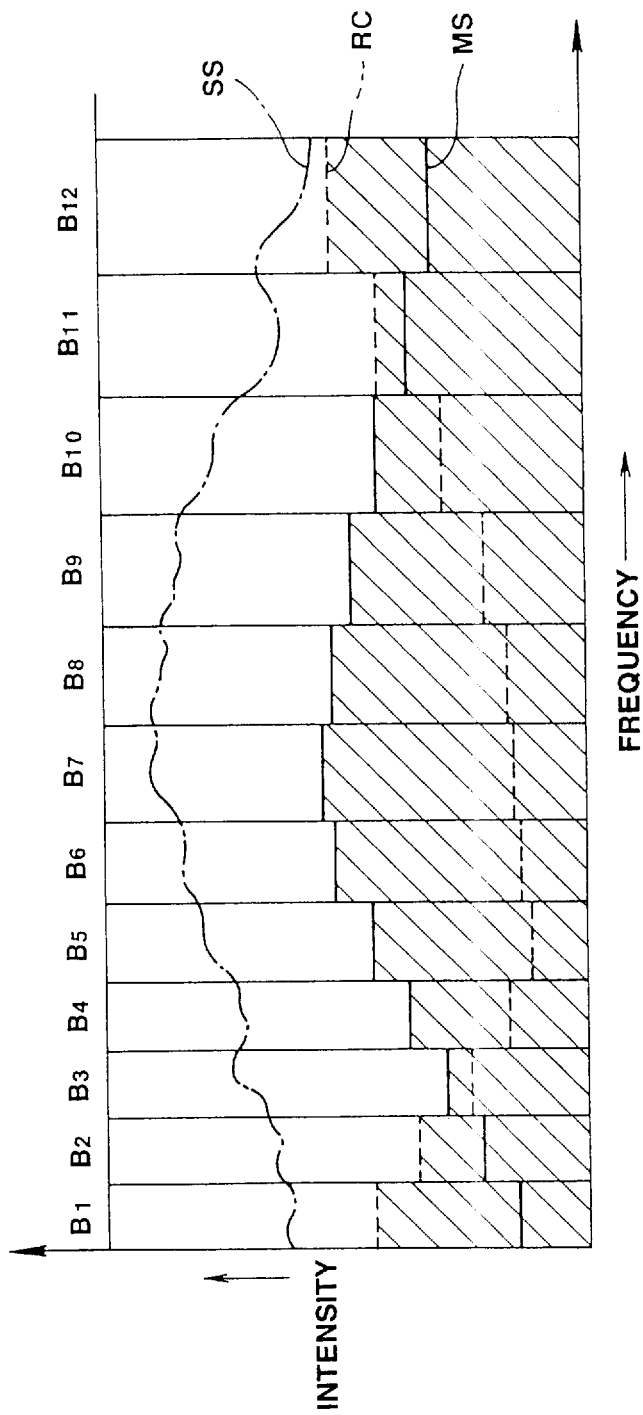
FIG. 7 is a graph showing a minimum audibility curve obtained on synthesis and a masking spectrum.

An output of the divider 31 is supplied to a synthesizer 32. The synthesizer synthesizes data representing the so-called minimum audibility curve RC supplied from a minimum audibility curve generating circuit 35 shown in FIG. 7 and the masking spectrum MS. FIG. 7 shows data representing the synthesized minimum audibility curve RC and the masking spectrum MS. If, in the minimum audibility curve, the absolute noise level is lower than the minimum audibility curve RC, the noise becomes inaudible. The minimum audibility curve differs with the difference in the reproducing sound level even if coding is made in the same manner. However, since there is no marked difference in the manner of the music entering the 16-bit dynamic range in actual digital systems, it may be presumed that, if the quantization noise of the frequency range in the vicinity of 4 kHz most perceptible to the ear is not heard, the quantization noise lower than the level of the minimum audibility curve is not heard in any other frequency range. Thus, if the recording/reproducing device is employed so that the noise in the vicinity of 4 kHz is not heard, and the allowable noise level is to be obtained by synthesizing the minimum audibility curve RC and the masking spectrum MS, the allowable noise level may be up to the level indicated by hatched lines in FIG. 7. In the present embodiment, the level of 4 kHz of the minimum audibility curve is matched to the minimum level corresponding to e.g., 20 bits. In FIG. 7, the signal spectrum SS is also shown.

An output of the synthesizer 32 enters an allowable noise correction circuit 33. The allowable noise correction circuit 33 corrects the allowable noise level in the output of the subtractor 28 based upon the information of the equal-loudness curve transmitted from a correction information outputting circuit 33. The equal-loudness curve is a characteristic curve concerning psychoacoustic characteristics of human aural sense, and is obtained by finding the sound pressures of the sound at the respective frequencies heard with the same loudness as the pure tone of 1 kHz and by connecting the sound pressures by a curve. It is also known as an equal loudness sensitivity curve. The equal-loudness curve also delineates a curve which is substantially the same as the minimum audibility curve RC shown in FIG. 7. With the equal-loudness curve, the sound in the vicinity of 4 kHz is heard with the same loudness as the sound of 1 kHz, even although the sound pressure is decreased by 8 to 10 dB from the sound of 1 kHz. Conversely, the sound in the vicinity of 10 kHz cannot be heard with the same loudness as the sound of 1 kHz unless the sound pressure is higher by about 15 dB than that of the sound of 1 kHz. Thus it may be seen that, in the allowable noise correction circuit 30, the allowable noise level preferably has frequency characteristics represented by a curve conforming to the equal-loudness curve. Thus it may be seen that correction of the allowable noise level in consideration of the equal-loudness curve is in conformity to psychoacoustic characteristics of the human auditory system. The masked frequency range, thus found, represents the perceptually redundant information so that the information can be correspondingly compressed.

Returning to FIG. 4, the difference information obtained by the adder 13 is sent to a modified DCT (MDCT) circuit 63 which is a sort of an orthogonal transform circuit. In lieu of the MDCT, the above-mentioned fast Fourier transform (FFT) or discrete cosine transform (DCT) may be employed as orthogonal transform. Discussions on MDCT may be found in J. P. Princen and A.B. Bradley, Univ. of Surrey Royal Melbourne Inst. of Tech., "Subband/Transform Coding Using Filter Bank Designs Based on Time Domain Aliasing Cancellation", ICASSP 1987.

An output of the MDCT circuit 63 then enters a bit allocation circuit 24. The bit allocation circuit 24 cuts off psychoacoustically redundant portions of the MDCT coefficients or frequency components of the psychoacoustically sensitive frequency region. This realizes information compression. For reducing the quantization noise as perceived by the hearer, the bit allocation by the bit allocation circuit 24 is performed so that the frequency components in the perceptually more sensitive frequency region will be left in a larger quantity. The resulting output is outputted from the reproducing band dividing unit 1 of FIG. 1A as the signal of a sub-band associated with the region $S_B$.

Figure 8:
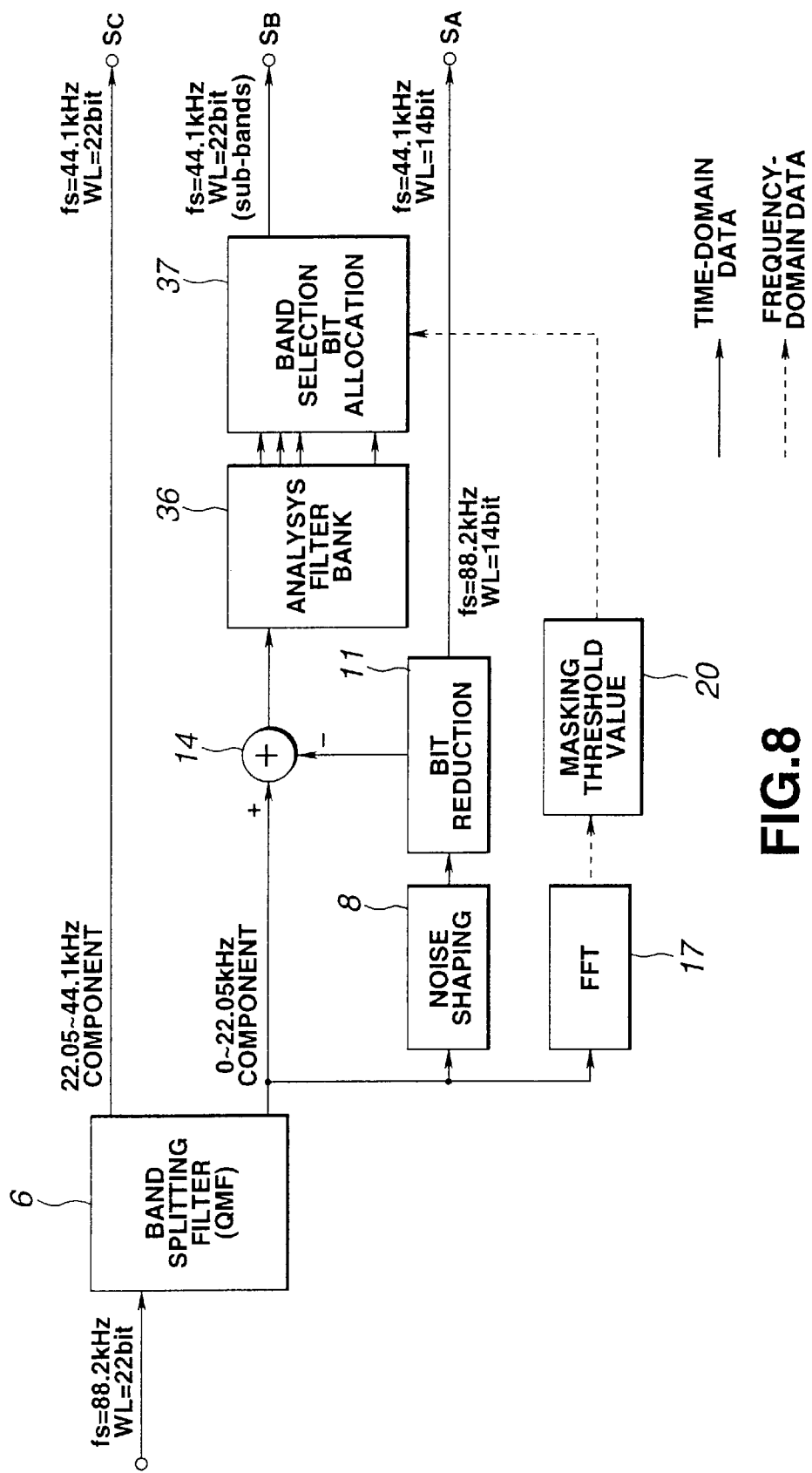
FIG. 8 is a block view showing an embodiment of a reproducing band splitting portion of the encoder (recording side) in case of splitting the entire frequency into three sub-bands.
Figure 9A:
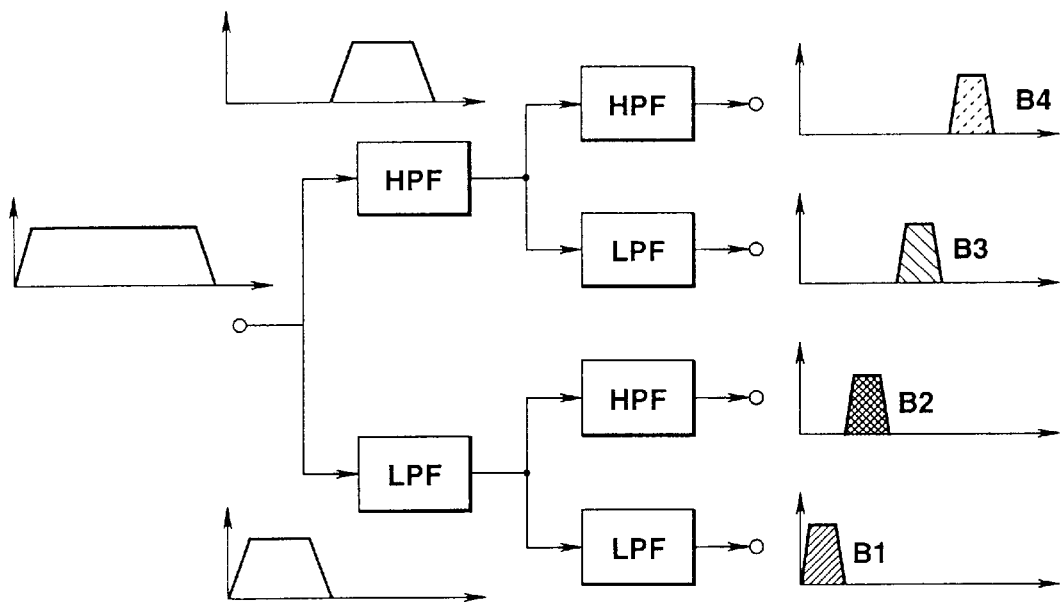
FIG. 9A illustrates band splitting by a poly-phase filter bank.
Figure 9B:
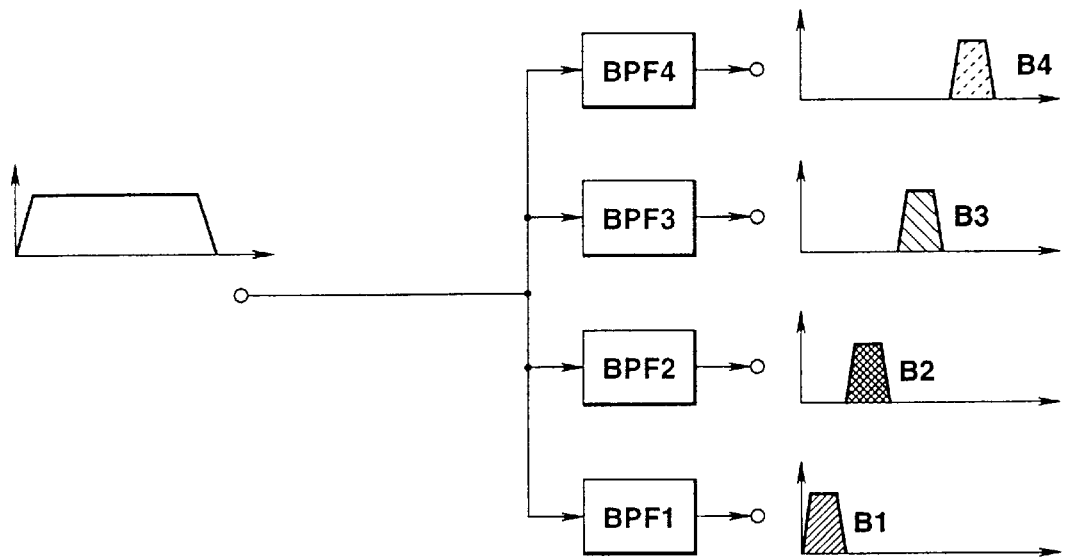
FIG. 9B illustrates band splitting by a poly-phase QMF.

Referring to FIG. 8, a modified embodiment of a reproducing band splitting portion of the encoder (recording side) in case of splitting the entire frequency into three sub-bands of $S_A$, $S_B$ and $S_C$ is explained. In the embodiment of FIG. 4, MDCT is applied collectively to the signal of the sub-band $S_B$ which is to be handled as frequency-domain data. In the embodiment of FIG. 8, the signal from the adder 14 is divided by an analysis filter bank 36 into finer bands, and only the perceptually required band is taken out from the masking spectrum as found on the sub-band basis, or the perceptually required spectral components are taken out on the sub-band basis, by a band selection/bit allocation circuit 37 for compressing the information volume. For division into finer bandwidth, a polyphase filter bank (PBF) shown in FIG. 9A or multi-stage QMF sown in FIG. 9B may also be employed. Discussion on the PBF may be found in A Tutori and P. P. Varidynathan, "Multirate Digital Filters, Filter Banks, Polyphase Networks and Applications, Proc., of IEEE, vol.78, No.1, 1990.

Figure 10:
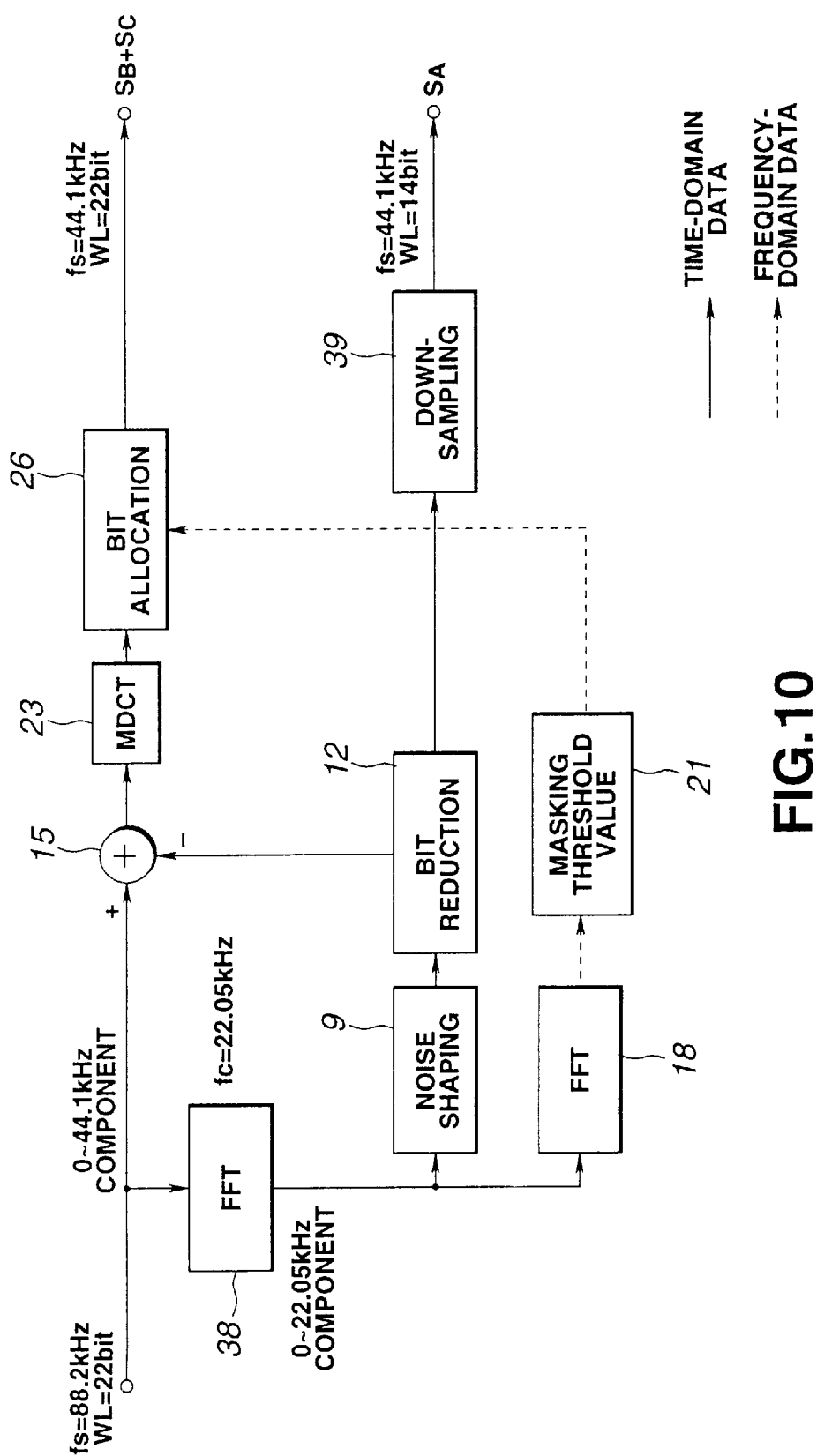
FIG. 10 is a block diagram showing an embodiment of a reproducing band splitting portion of the encoder (recording side) in case of splitting the entire frequency into three sub-bands.

Referring to FIG. 10, an embodiment of a reproducing band splitting portion of the encoder (recording side) in case of splitting the entire frequency into two sub-bands, that is a region $S_A$ and $S_B+S_C$, is explained in detail.

Referring to FIG. 10, signal components not less than 22.05 kHz are cut off by an LPF 38 having the cut-off frequency of 22.05 kHz. The signal now containing only signal components not higher than 22.05 kHz is supplied to a noise shaping circuit 9 for reducing psychoacoustic effects of the quantization noise generated on conversion into data having shorter word length. The noise shaping circuit 9 diminishes the psychoacoustic effect of the quantization noise. Instead of performing the noise shaping on data transmitted through the LPF 38, the noise shaping may be performed on the entire frequency range and the resulting noise-shaped data may then be transmitted through the LPF 38.

An output of the noise shaping circuit 9 enters a bit reduction circuit 12, as in the circuit shown in FIG. 4. The bit reduction circuit 12 reduces the number of input quantization bits of 22 to e.g., 14 by rounding off or truncation. The sampling frequency of an output obtained by the bit reduction circuit 12 is 88.2 kHz, which is the same as the input signal frequency and which is double the sampling frequency used for the CD player. Thus the output of the bit reduction circuit 12 enters a down-sampling circuit 39. For producing an output of the sub-range $S_A$, the down-sampling circuit 39 converts the sampling frequency from 88.2 kHz to 44.1 kHz as an output for the region $S_A$. There are a variety of methods for down-sampling the sampling frequency to one-half. However, since this signal contains only signal components not higher than 22.05 kHz which is one-half the Nyquist frequency of the sampling frequency of 44.1 kHz, the signal can be simply decimated every other sample in order to effect down-sampling without generating aliasing distortion. The signal obtained by the down-sampling circuit 39 becomes a sub-band output of the region $S_A$.

An output of the bit reducing circuit 12 enters an adder 15 which then calculates the difference between the input signal and an output of the bit reducing circuit 12. The difference becomes the signal of the sub-band combined from the regions $S_B$ and $S_C$. However, if the sub-word is accorded to the difference information itself, the bits fall in shortage because of the large information volume of the difference information. Thus the difference information needs to be compressed by some means or other. Thus, only the perceptually required portions are taken out by the bit allocation circuit 26 in the same way as in FIG. 4 so as to be used as an output of the reproducing band dividing unit 1. Thus, in the same way as in FIG. 4, the signal obtained by the LPF 38 is fed to an FFT circuit 18 and the input signal is converted into frequency-domain data. The frequency-domain data is then supplied to the masking threshold circuit 21 which then finds the masking spectrum from the input signal.

The difference information of the adder 15 is supplied to a MDCT circuit 23 which then converts the input difference signal into frequency-domain data which is supplied to the bit allocation circuit 26. Using the masking curve as found by the masking threshold value circuit 21, the bit allocation circuit 26 cuts off the frequency components as found by the MDCT circuit 23, or the perceptually redundant portion of the MDCT coefficient, for compressing the information. The resulting output becomes the signal of the sub-band combined from the regions $S_B$ and $S_C$ and is outputted from the reproducing band dividing unit 1.

Figure 11A:
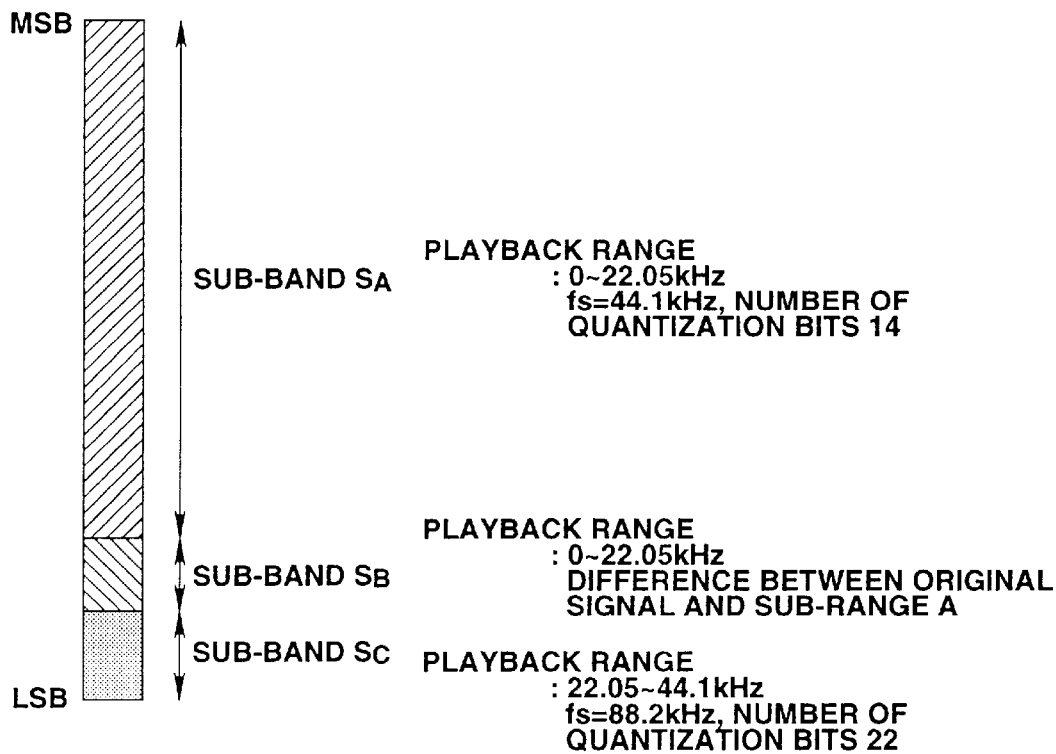
FIG. 11A illustrates the relation of allocation of sub-words and three sub-bands obtained on dividing a word of digital signals.
Figure 11B:
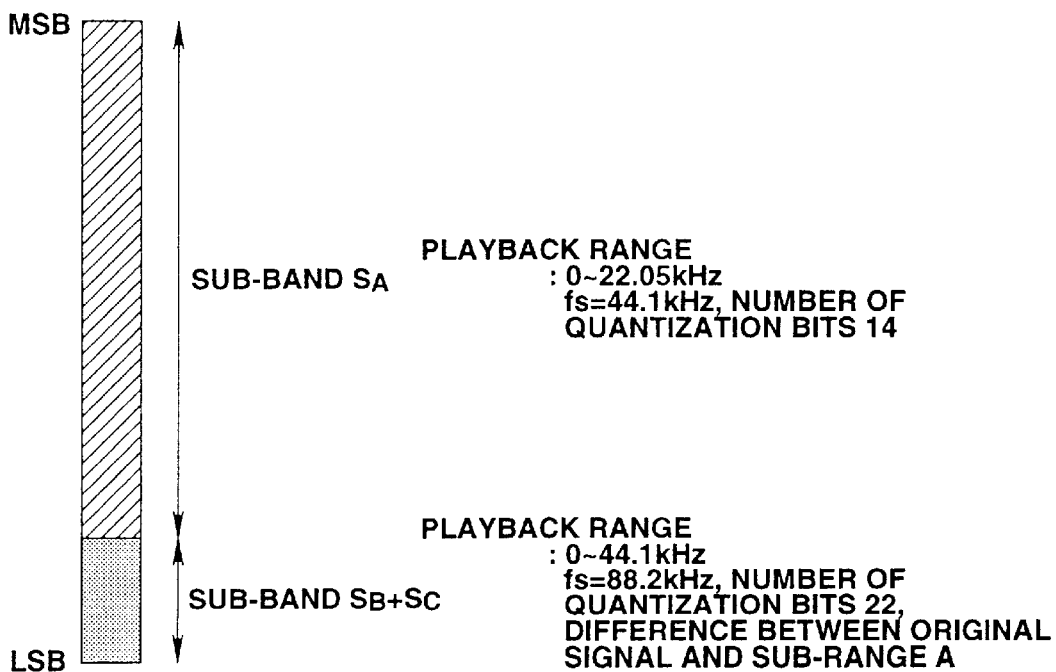
FIG. 11B illustrates the relation of allocation of sub-words and two sub-bands obtained on dividing a word of digital signals.

The signal thus divided into two or three sub-bands is supplied to a sub-band encoding unit 2 shown in FIG. 1A. The respective sub-bands are allocated by sub-word allocation to a sub-word divided from the PCM word. This sub-word is recorded on the compact disc. Referring to FIG. 11, the number of quantization bits for CD is 16, that is each word is made up of 16 bits, with the dynamic range being 98 dB. On the other hand, the value of each word is represented in two's complement, with the highest order bit being termed MSB (most significant bit) and the lowest order bit being termed the LSB (least significant bit). The sub-band of the region $S_A$ recorded with the straight PCM data is 14 bits/sample so that the number of bits allocatable to the sub-band of the regions $S_B$, $S_C$ is 2 bits/sample. Referring to FIGS. 11A and 11B, the sub-word has the sub-band of the region $S_A$ allocated to the MSB side, while having the sub-band of the regions $S_B$ and $S_C$ allocated to the LSB side. This sub-word is transmitted or recorded on the compact disc. The sub-word allocated to the sub-band of the regions $S_B$ and $S_C$ may be varied depending upon the information volume instead of being a sub-word of fixed length. The sub-word allocated to each sub-band is outputted from the sub-band encoding unit 2.

For the sub-band of the regions $S_B$ and $S_C$, the information volume is compressed by exploiting the psychoacoustic characteristics of the human auditory system. However, since the information volume is excessively large for recording two bands in two bits, it is necessary to perform high-efficiency encoding on the sub-band signals for compressing the information volume as much as possible.

Figure 12:
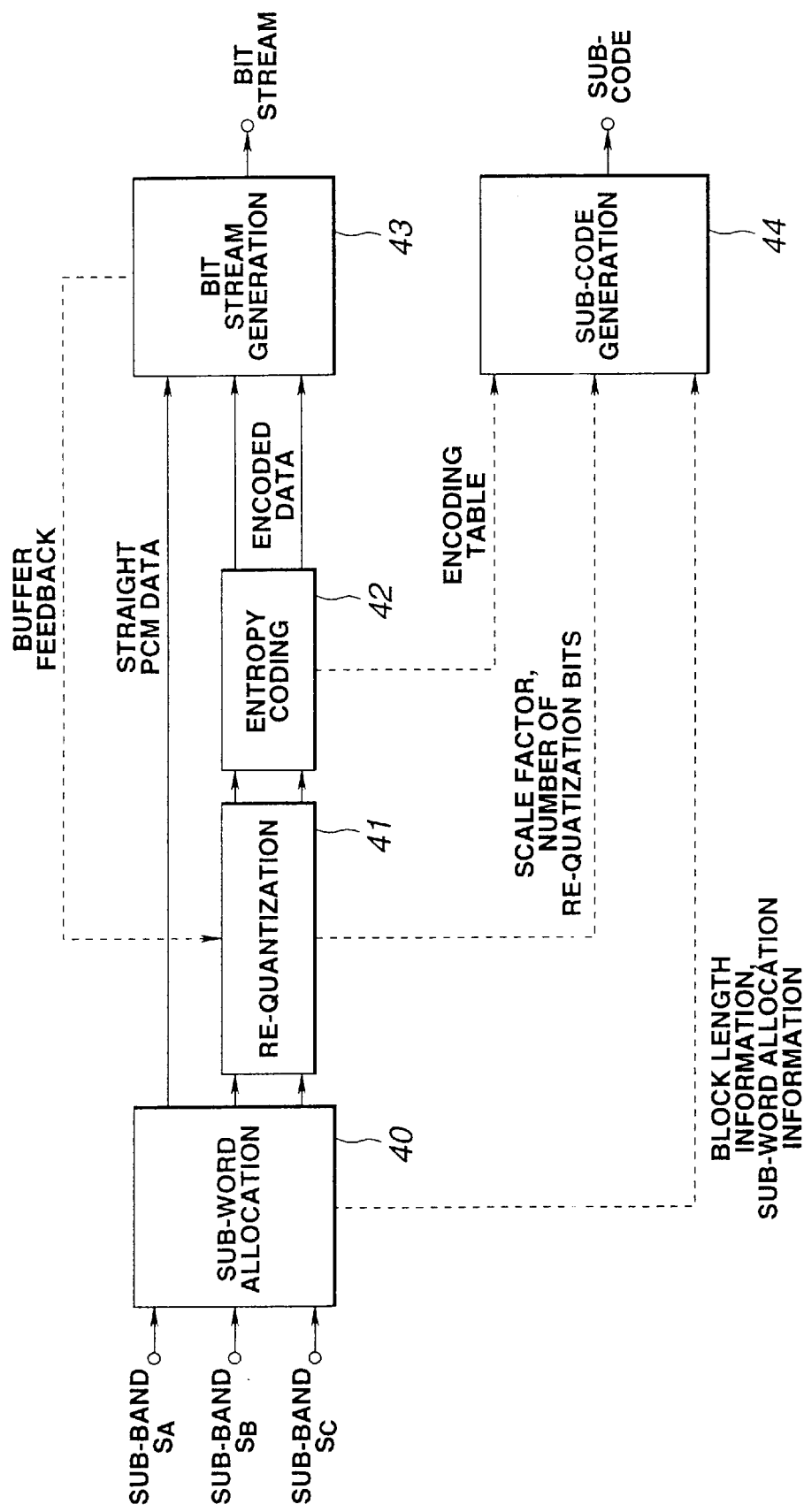
FIG. 12 is a block diagram showing a schematic arrangement of sub-band encoding portion of the encoder (recording side) shown in FIG. 1A.

Referring to FIG. 12, an embodiment of the sub-band encoding unit 2 is explained in detail.

The signals of the sub-bands $S_A$, $S_B$ and $S_C$ from the reproducing band dividing unit 1 shown in FIG. 1A are supplied to a sub-word allocating unit 40 which then allocates sub-words to signals of the respective sub-bands. The sub-word allocating unit 40 allocates a sub-word associated with the sub-band signals of the regions $S_A$ to a bitstream generating circuit 43, while allocating the sub-word associated with the sub-band signals of the regions $S_B$ and $S_C$ to the re-quantizer 41 and allocating the block length information and the sub-word allocation information to the sub-code generating circuit 44.

Figure 13A:
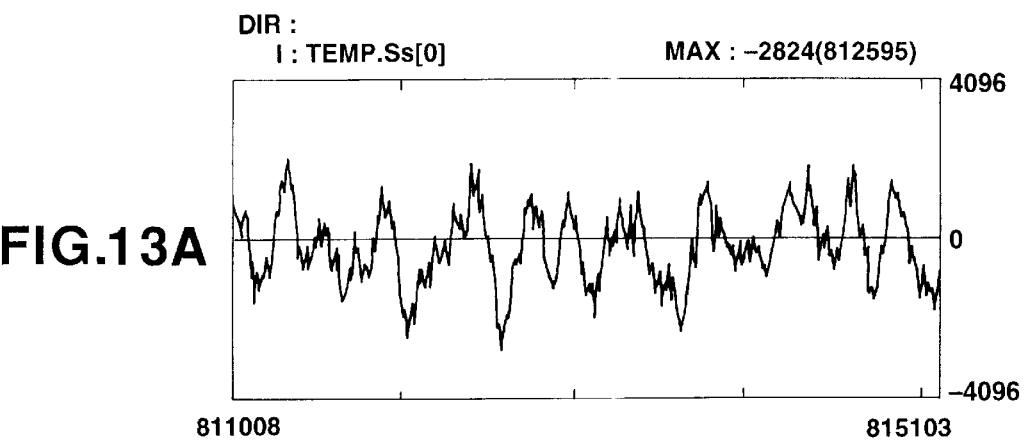
FIG. 13A shows a typical input signal and its frequency spectrum.
Figure 13B:
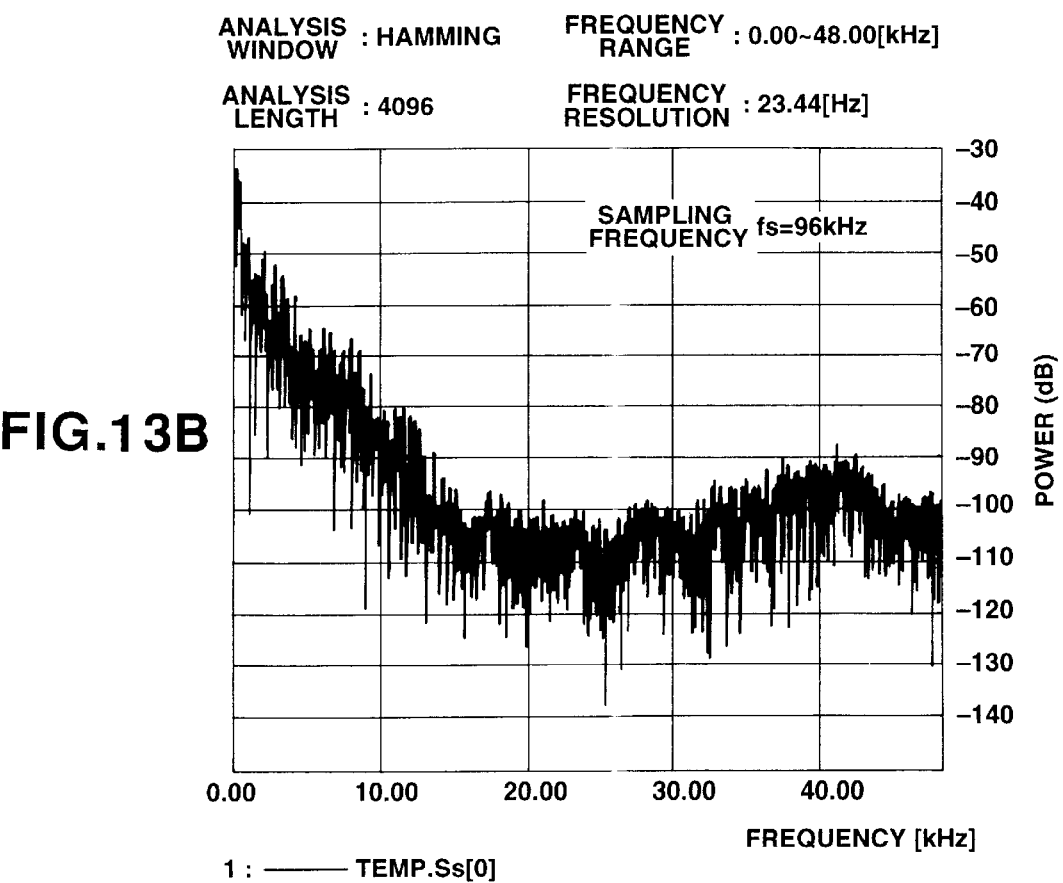
FIG. 13B shows another typical input signal and its frequency spectrum.
Figure 14:
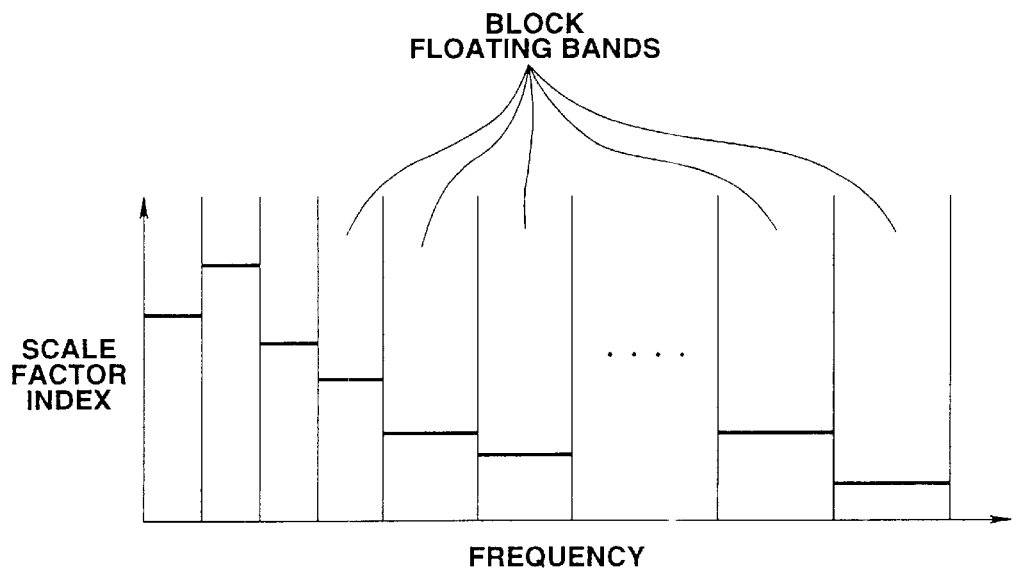
FIG. 14 is a graph illustrating typical block floating.

The sub-band signal of the regions $S_B$ and $S_C$ may be difference signals or signals of a frequency range not lower than 22.05 kHz. Therefore, a significant portion of the 22 quantization bits represents redundant bits. The information of the sub-band of the region $S_C$ has an extremely low signal power and hence may be represented by a small number of bits on the order of eight bits, as may be seen from FIGS. 13A and 13B. If the input signal to the sub-band encoding unit 2 of FIG. 1A is the time-domain signal, as in the case of the output of the sub-band $S_C$, redundant bits are removed in the re-quantizer 41 so that 22-bit sub-band signals of the regions $S_B$, $S_C$ will be represented by about eight bits. Since the sub-band signals of the region $S_A$ are of 14 bits, the difference signals between the 22-bit original signals of the region $S_B$ and the sub-band signals of the region $S_A$ may be represented by 8 bits. If the input signal to the sub-band coding unit 2 of FIG. 1A is the frequency-domain data, as is the output of the sub-band of the region $S_B$ of FIG. 4, a sub-block is formed by plural samples by the re-quantizer 41 and normalization (block floating) is executed on the sub-block basis. At this time, the scale factor is obtained as a coefficient indicating to which extent the block floating has been performed. The size of the sub-block for block floating is selected to be smaller and larger with decreasing frequency and with increasing frequency, respectively, as shown in FIG. 14. The reason is that signal changes are larger and smaller for the lower and higher ranges, respectively. The re-quantization by rounding off is performed for reducing the quantization noise. If perceptually sensitive frequency components are re-quantized, re-quantization is performed with a larger number of re-quantization bits for reducing the quantization noise.

The number of re-quantization bits and the scale factor obtained by the re-quantizer 41 are recorded by being allocated to usually unused subcodes R to W of the CD format in separation from the sub-band data. These sub-band data are occasionally used as graphics data.

Referring to FIG. 3, each subcode has one byte per frame and 784 bits per block (588 bits for R to W). If each unit is made up of eight blocks, the usable sub-code areas R to W has 4704 bits (2352 bits on the channel basis).

An output of the re-quantizer 41 is supplied to an entropy encoding circuit 42 which then encodes the re-quantized data by techniques exemplified by e.g., Huffman encoding. The entropy encoding is performed in accordance with an encoding table of allocating codes in association with the respective sample values. This table is formulated on the unit basis so that codes with shorter code lengths will be allocated to sample values having higher frequency of occurrence. The Huffman coding is described in detail in D. A. Huffman, "A Method for Construction of Minimum Redundancy Codes", Proc.I.R.E., 40, p.1098 (1952). For entropy coding, the Lempel-Ziv encoding described in J. Ziv and A. Lempel, "A Universal Algorithm for Sequential Data Compression", IEEE Trans. on Inform.Theory Vol. IT-23, No.3, pp.337 to 343, 1977, or the arithmetic coding, as described in F. Telinek, "Buffer Overflow in Variable Length Coding of Fixed Rate Sources", IEEE Trans. Inform. Theory, Vol.IT-14, pp.490–501, 1968, may be employed in lieu of the Huffman encoding.

Figure 15:
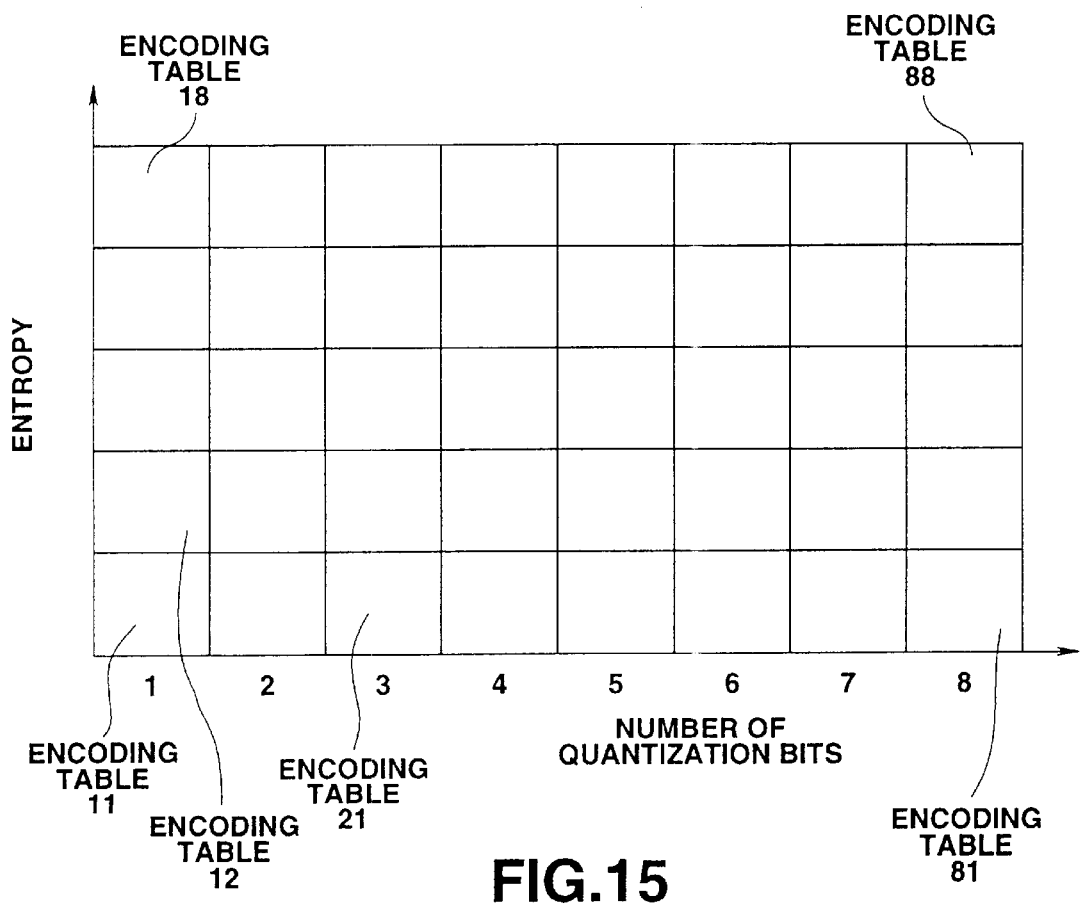
FIG. 15 illustrates a typical constitution of an encoding table for entropy coding.

Similarly to the scale factors and the number of re-quantization bits, the encoding table is recorded by being allocated to the sub-codes R to W. In the above-described embodiments, the encoding table for entropy coding is formulated on the unit basis, and the encoding table is allocated to the sub-code. It is however possible to provide a code table ROM having a code table pre-stored therein on the encoder (recording side) and on the decoder (reproducing side) so that the code table will be read out therefrom in order to effect encoding and decoding. Several tables are provided in the code table ROM for each quantization bit so that an optimum table will be employed in dependence upon input signal distribution. The encoder (recording side) records the table number of the table employed for decoding by allocation to subcode and the decoder reads out the subcode for determining the code table and for effecting decoding using the code table, as shown for example in FIG. 15. This method has such merits that, since there is no necessity of recording a large amount of encoding tables in the subcode, there is no risk of the capacity for the code table becoming depleted on reducing the size of the unit, and that, since the code is only such code indicating which table has been employed, the subcode readout error is hardly produced. Since it is known from the information on the table used with which number of bits the high-range data has been re-quantized, it is unnecessary to allocate and record the re-quantization bits in contradistinction from the embodiment shown in FIG. 12.

In the present embodiment, the unit block length is fixed. It is however possible to provide a variable unit block length and to effect encoding with the block length with the lowest entropy value as a unit length. This achieves a higher compression ratio. It is necessary in such case to transmit or record the unit length on the compact disc. This data is recorded by being allocated in the sub-code.

Although the sub-bands of the regions $S_B$ and $S_C$ are compressed by entropy coding in the above-described embodiment, it is also possible to transmit or record the sub-bands of the regions $S_B$ and $S_C$ on the compact disc by non-linear quantization, such as linear predictive coding (LPC) or ADPCM or vector quantization or to encode the encoded data further by entropy coding. Discussions on the LPC may be found in Itakura and Saito, "Speech Analysis/Synthesis Transmission System by Most Likelihood Spectrum Estimation Method", Extended Abstract to the Society of Acoustics, pp.231, 1967, or in B. S. Atal and M. R. Schroeder, "Predictive Coding of Speech Signals" in Reports of 6th Int. Conf. Acoust., C-5-4, 1968. There are also many literatures on calculation algorithms which are not specifically given herein.

Straight PCM data of the sub-band of the region $S_A$ of the sub-word allocation circuit 40 and the sub-word to which is allocated the high-efficiency code of the sub-band of the regions $S_B$ and $S_C$ from the entropy encoding circuit 42 are supplied to a bitstream generating circuit 43. The bitstream generating circuit 43 judges whether or not the encoding has been done in the total sub-word to which the sub-bands of the regions $S_B$ and $S_C$ have been allocated and routes the judgment information to the re-quantizer 4 by way of buffer feedback. If the information that encoding cannot be done in the sub-word to which the sub-bands of the regions $S_B$ and $S_C$ have been allocated is furnished by way of buffer feedback, the re-quantizer 41 effects re-quantization by reducing the number of re-quantization bits, while effecting re-encoding by increasing the compression efficiency. The encoding table is updated each time so that encoding will be performed using an optimum table. If the number of re-quantization bits is reduced in the re-quantizer 41, the quantization noise is increased, even although the compression efficiency is improved.

The subcode generating circuit 44 generates the subcode from data including the encoding table, the number of re-quantization bits, scale factor, sub-word allocation information or the block length information.

In this manner, the subcode and the bitstream of the generated waveform data are recorded on a recording medium, such as a compact disc, and/or transmitted on a transmission channel.

The decoder (reproducing side) is now explained.

Figure 16:
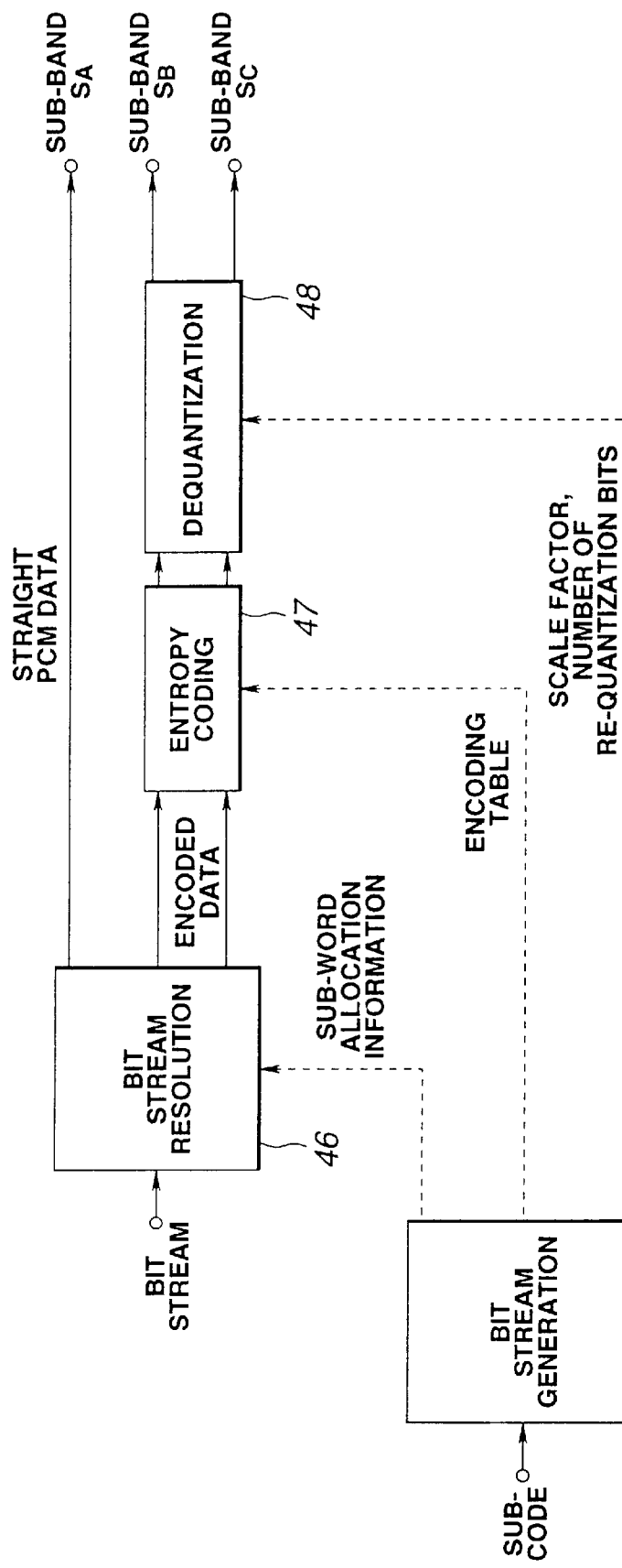
FIG. 16 is a block diagram showing an embodiment of a sub-band decoding portion of a decoder (reproducing side).

The encoded bitstream is supplied to the sub-band decoding unit 3 of FIG. 1B. FIG. 16 shows an embodiment of the sub-band decoding unit 3.

A sub-word resolution circuit 45 receives the sub-code and resolves it in order to take out the information required for decoding the bitstream such as the sub-code allocation information, number of re-quantization bits, scale factor or the encoding table.

A bitstream resolution circuit 46 receives the bitstream and takes out signals of the sub-bands of the regions $S_A$, $S_B$ and $S_C$ from the bitstream based upon the sub-word allocation information obtained by the sub-word resolution circuit 45. Of these signals, the signals of the sub-band of the region $S_A$ are straight PCM data and hence are directly outputted from the sub-band decoding unit 3 of FIG. 1B.

The entropy decoding circuit 47 receives signals of the sub-bands of the regions $S_B$ and $S_C$ from the bitstream resolving circuit 46 and decodes the signals of the sub-bands $S_B$ and $S_C$ using the code table obtained by the subcode resolving circuit 45.

The decoded data is supplied to a dequantizer 48. The dequantizer 48 dequantizes the decoded data using the scale factor and the number of re-quantization bits obtained in the sub-code resolving circuit 45 to derive signals of the sub-bands of the regions $S_B$ and $S_C$ as outputs of the sub-band decoding unit 3.

The information of the three or two sub-bands, obtained in this manner, is sent to the reproducing band synthesizing or connecting unit 4 for synthesis to the original sole band.

Figure 17:
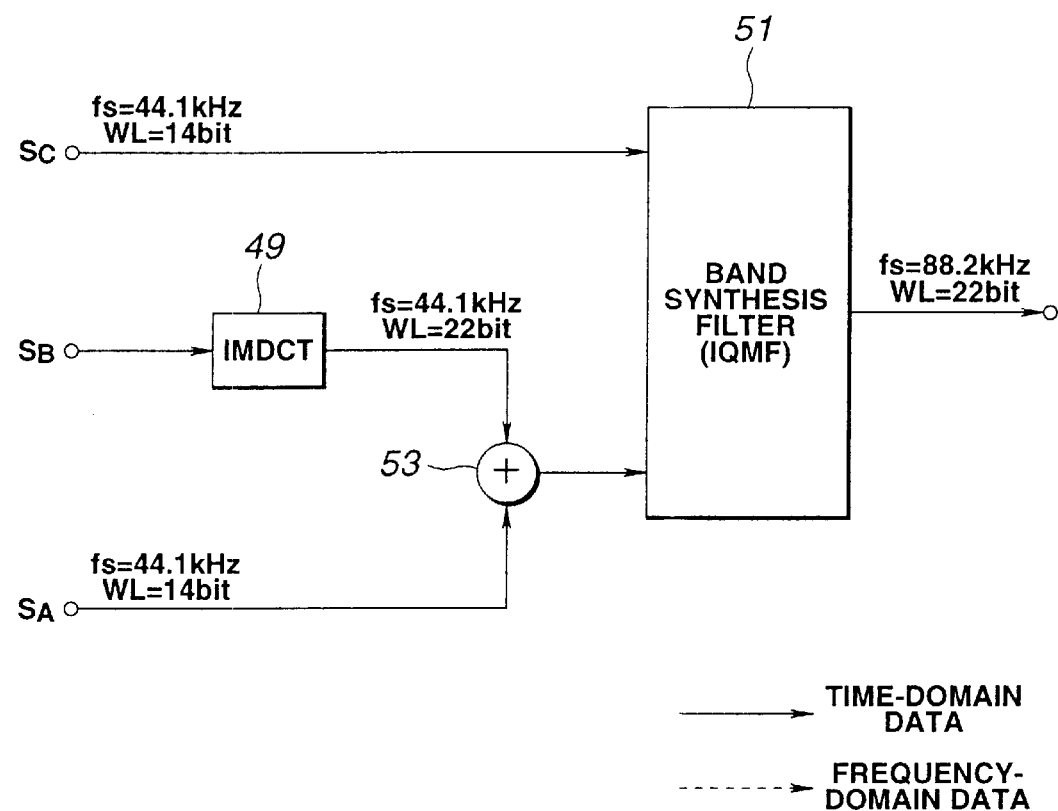
FIG. 17 is a block view showing an embodiment of a reproducing connection portion of a decoder (reproducing side) in case of splitting the entire frequency spectrum into three sub-bands.

Referring to FIG. 17, the reproducing band connecting unit corresponding to the embodiment of the reproducing band dividing unit, in which the input signal is divided into three sub-bands, is explained in detail.

In FIG. 17, the input signal of the sub-band $S_B$ is supplied to an IMDCT circuit 49. Since the signal of the sub-band of the region $S_B$ supplied to the IMDCT circuit 49 is the frequency-domain data, it is processed with IMDCT by the IMDCT circuit 49 so as to be thereby restored to time-domain data. Discussions on the IMDCT are found in the above-given references to MDCT. The sub-band signals of the region $S_B$ from the IMDCT circuit 49 are supplied to a synthesizer 53. The sub-band signals of the region $S_A$ are also supplied to a synthesizer 53. Since the signal of the sub-band of the region $S_B$ is the difference signal between the original signal and the signal of the sub-band of the region $S_A$, it is summed by the synthesizer 53 to the signal of the sub-band of the region $S_A$ by the synthesizer 53 to produce a signal having the number of quantization bits of 22. The signal obtained by the synthesizer 53 and the signal of the sub-band of the region $S_C$ are both supplied to a synthesizing filter 51 which is typified by an inverse quadrature mirror filter (IQMF) synthesizing the low range and high range signals together. This filter is an interpolation filter capable of synthesizing two signals reduced to one-half the original number of samples by decimation for restoration to the original number of samples. Discussions on IQMF are found in the above-given references on the QMF. Although the filter other than the IQMF may be employed as the band synthesizing filter, an ICQF needs to be employed if the CQF is employed for band splitting since the band synthesizing filter is a counterpart of the band splitting filter in the encoder. The resulting output is an output of the reproducing band connecting unit 4 and the overall system.

Figure 18:
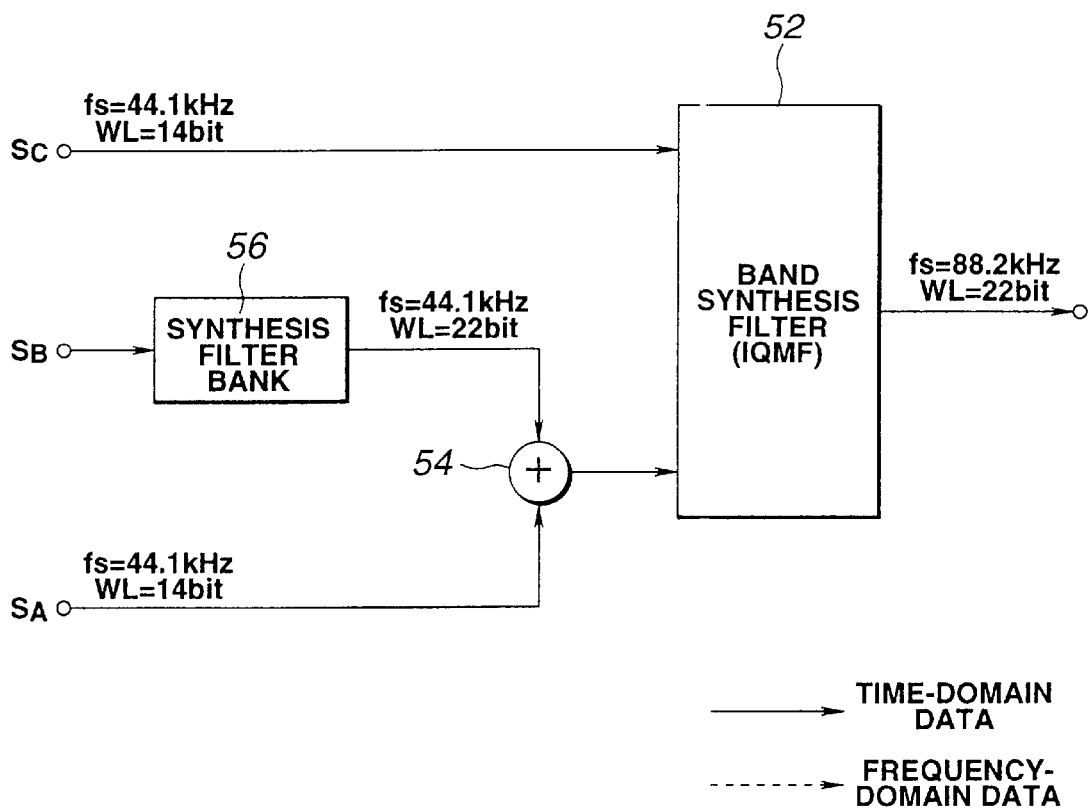
FIG. 18 is a block view showing another embodiment of a reproducing connection portion of a decoder (reproducing side) in case of splitting the entire frequency spectrum into three sub-bands.

Referring to FIG. 18, the reproducing band connecting unit, as a counterpart unit of the reproducing band splitting unit configured for dividing the input signal into three sub-bands, is explained by referring to FIG. 18.

In the present embodiment, since the sub-band of the region $S_B$ is divided by PFB into finer bandwidth, a synthesis filter bank 56 restores the bandwidth to the original bandwidth of the sub-band of the region $S_B$. The synthesizing filter bank is described in detail in the references on the analysis filter bank. The remaining portions of FIG. 18 correspond to those of FIG. 17.

Figure 19:
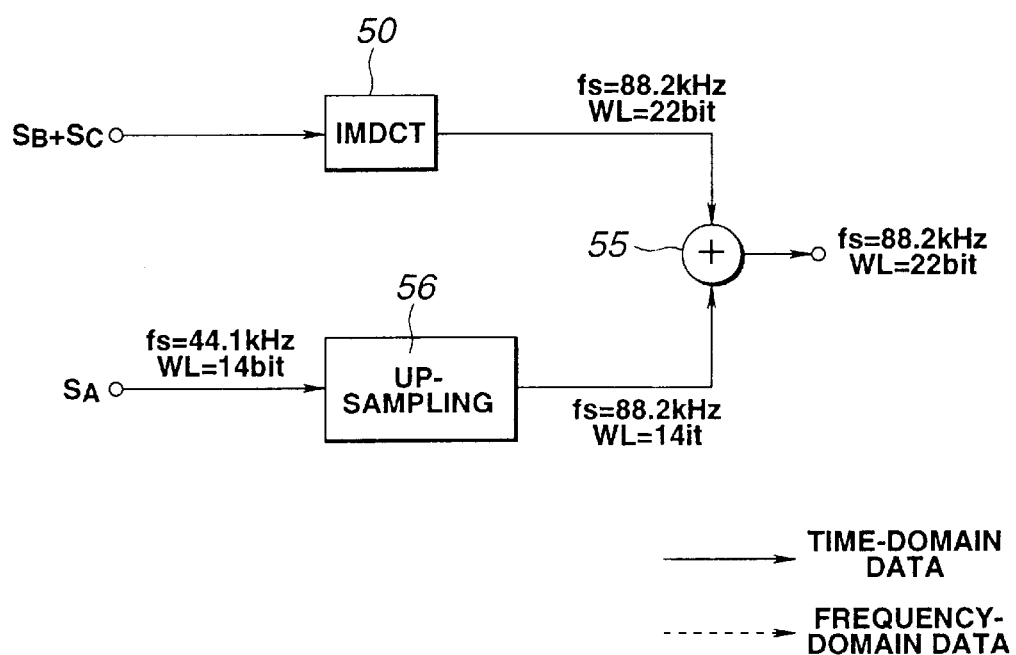
FIG. 19 is a block view showing an embodiment of a reproducing connection portion of a decoder (reproducing side) in case of splitting the entire frequency spectrum into two sub-bands.

Referring to FIG. 19, the reproducing band connecting unit, which is a counterpart unit of the reproducing band dividing unit in which the regions $S_B$, $S_C$ are combined into a sub-band, that is in which the input signal is divided into two sub-bands, is explained in detail.

In FIG. 19, the signal of the sub-band, combined from the input regions $S_B$, $S_C$, is supplied to an IMDCT circuit 50. Similarly to the signal of the sub-band of the region $S_B$ of FIG. 4, the signal of the sub-band combined from the regions $S_B$, $S_C$ is the frequency-domain data, the signal of the sub-band combined from the regions $S_B$, $S_C$ is restored by IMDCT into the time-domain data. The signal of the sub-band of the region $S_A$ is supplied to an up-sampling circuit 57. Since the sampling frequency of the signal of the sub-band of the region $S_A$ is down-sampled to 44.1 kHz, which is one-half the sampling frequency of the original signal, the up-sampling circuit 57 up-samples the signal of the sub-band of the region $S_A$ to a double frequency, that is 88.2 kHz. Although there are a variety of methods for up-sampling to 88.2 kHz which is double the sampling frequency of 44.1 kHz, it suffices to insert "0" every other sample. The signal produced by the IMDCT circuit 50 and the signal obtained by the up-sampling circuit 57 are both supplied to the synthesizer 55. The synthesizer 55 synthesizes the signal produced by the IMDCT circuit 50 and the signal obtained by the up-sampling circuit 57 to produce an output signal of the reproducing band connecting unit 4.

In the above embodiment, since the processing is executed on the unit basis, it is not possible with the readout velocity of the conventional recording medium to cope with the processing during reproduction thus producing time delay of data. For overcoming this deficiency, data is read out at a velocity faster than the readout velocity with the conventional recording medium. For example, in the case of a compact disc, it is rotated at a velocity faster than the usual readout velocity, such as a velocity equal to double the usual readout velocity. The data read out from the disc is temporarily stored in a memory from which the data is read out sequentially and processed by way of reproduction. This not only eliminates the delay of data but intensifies the effect of preventing sound skipping otherwise caused by vibrations. It is also possible with the use of an error correction code in which emphasis is put on the MSB side in which is recorded the low frequency range as the usual reproducing range to reduce readout errors of the usual reproducing range for preventing deterioration in the sound quality.

Figure 20:
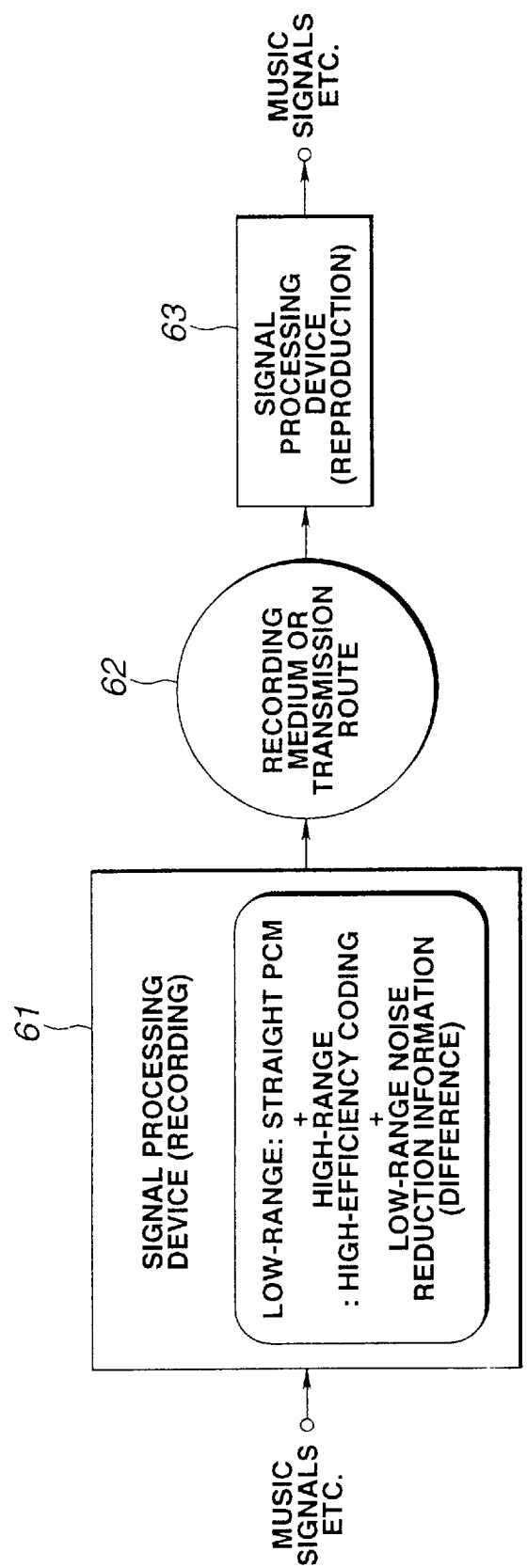
FIG. 20 illustrates schematics of an embodiment (system) embodying the present invention.

The present invention is not limited to the above-described embodiment, but may also be applied to information transmission employing communication means or transmission medium, such as ISDN, or a recording medium, such as digital video or IC card. In FIG. 20, a signal processing device 61 divides the input music signals into low-range information signals, the region of the difference information as the low-range noise-reducing information and the high-range information signals, associated with the regions $S_A$, $S_B$ and $S_C$, respectively, and records the information signals on a recording medium or transmits the information signals on a transmission route 62. The signals produced from the recording medium or the transmission route 62 is reproduced or received by a signal processing device 63 which then outputs music signal or the like.

If the error correction code in which emphasis is put on the MSB side is used, the signal readout error of the conventional reproducing band may be reduced in case the transmission distance is protracted during transmission to produce code errors.

It is also possible to introduce the concept of scalability in which the reproducible sub-band may be selected depending upon the hardware scale and the transmission distance in the reproducing device.

Figure 21:
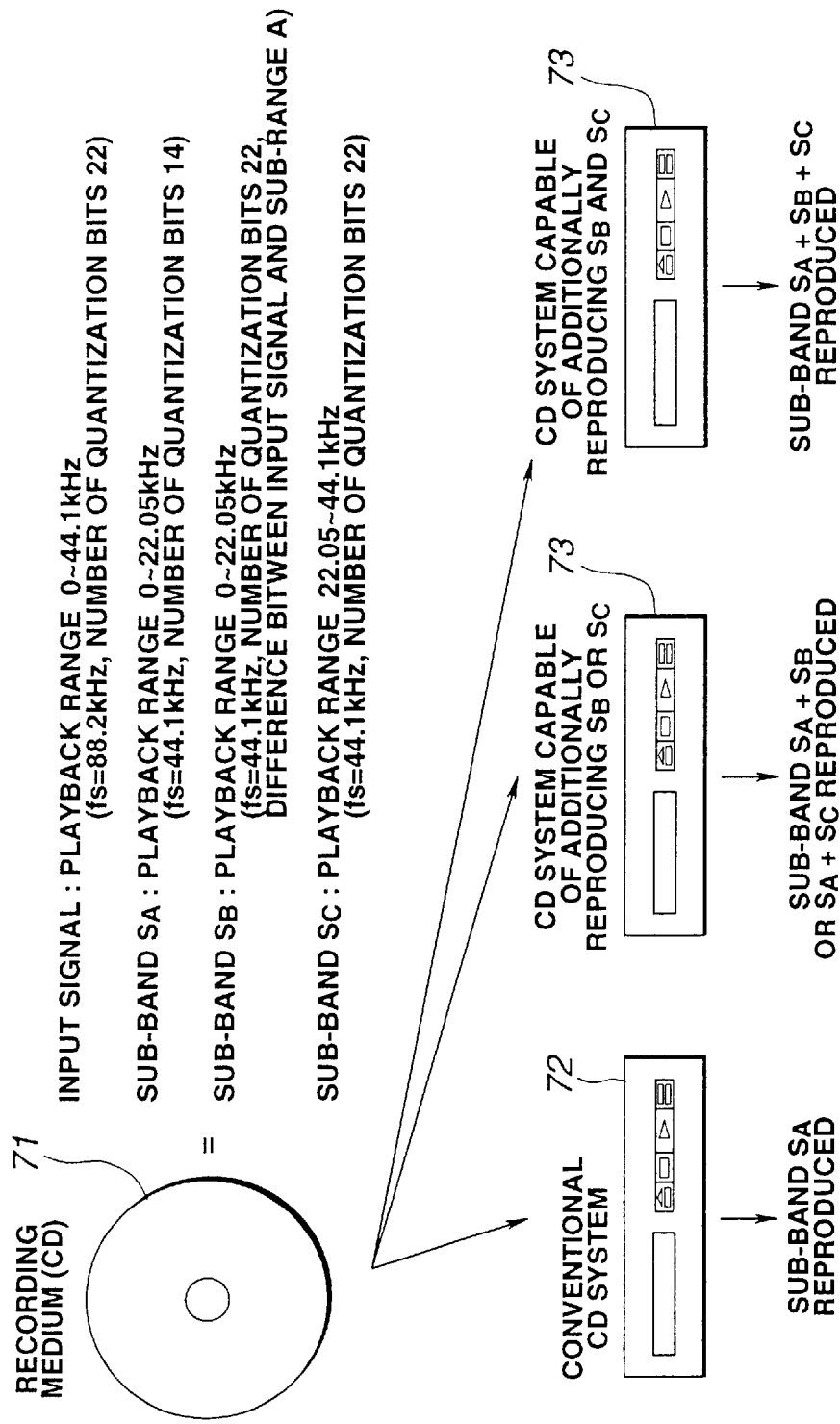
FIG. 21 illustrates an embodiment of scalability of a reproducing band in a disc reproducing system.

That is, if, in the embodiment shown in FIG. 21, signals of the sub-bands of the three regions $S_A$, $S_B$ and $S_C$ are recorded on the recording medium, such as a CD or a magneto-optical disc, the conventional CD reproducing system 62 is employed, it is possible for the conventional CD reproducing system 62 to reproduce signals of the sub-band of the region $S_A$. If the disc reproducing system 63 capable of reproducing the region $S_B$ and occasionally the sub-band $S_C$ is used, it is possible with this disc reproducing system to reproduce signals of the sub-band of the regions $S_A$ and $S_B$ or signals of the sub-band of the regions $S_B$ and $S_C$. It is naturally possible with this disc reproducing system to reproduce only the signals of the sub-band of the region $S_A$. On the other hand, with the disc reproducing system 64 capable of reproducing the regions $S_B$ and $S_C$, it is possible to reproduce the signals of the sub-bands of the regions $S_A$, $S_B$ and $S_C$. It is naturally possible with this disc reproducing system to reproduce signals of the regions $S_A$ and $S_B$ or signals of the regions $S_B$ and $S_C$.

Figure 22:
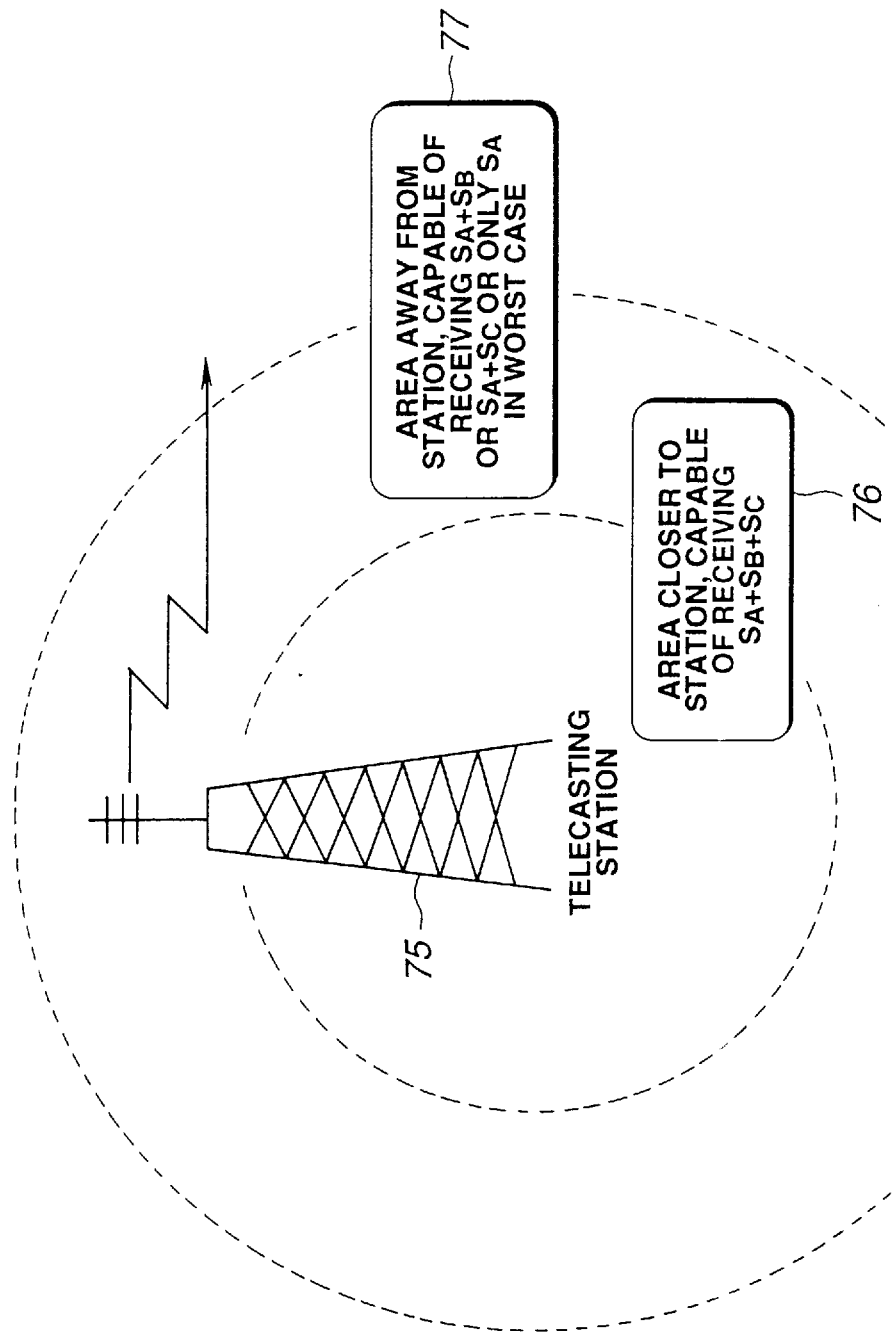
FIG. 22 illustrates an embodiment of scalability of a reproducing band in a broadcasting (transmission system).

With the embodiment of FIG. 22, if the signals of the sub-bands of the three regions $S_A$, $S_B$ and $S_C$ are transmitted from a broadcasting station 75, a reception area 66 near the station 65 is capable of receiving signals of the sub-bands of the totality of the regions $S_A$, $S_B$ and $S_C$. On the other hand, a reception area 67 further from the station 65 is capable of receiving signals of the sub-bands of the regions $S_A$ and $S_B$ or the sub-bands of the regions $S_A$ and $S_C$ or, in the worst case, only the region $S_A$.

In the above explanation, it is assumed that the number of quantization bits is allocated to the frequency components of a signal at the same point on the time axis. However, more efficient bit allocation may be achieved by considering bit allocation to other regions on the time axis.

Figure 23A:
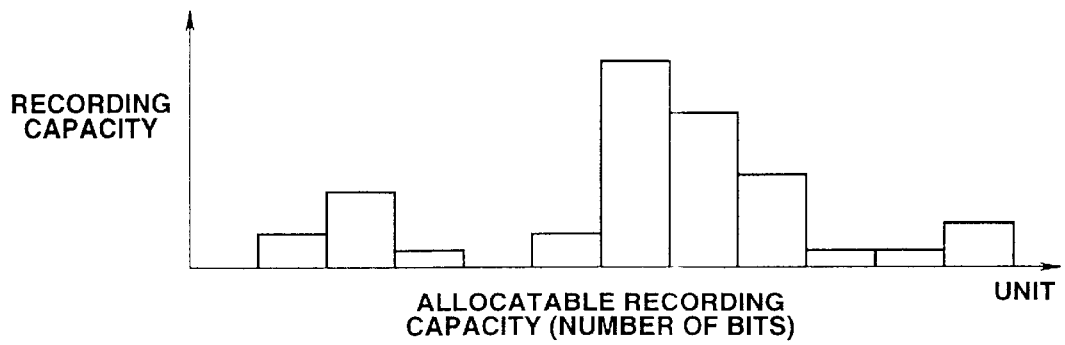
FIG. 23A is a graph showing an example of bit allocation between temporally different units in case bit allocation in a recording method in which the entire frequency spectrum is divided into plural sub-bands.
Figure 23B:
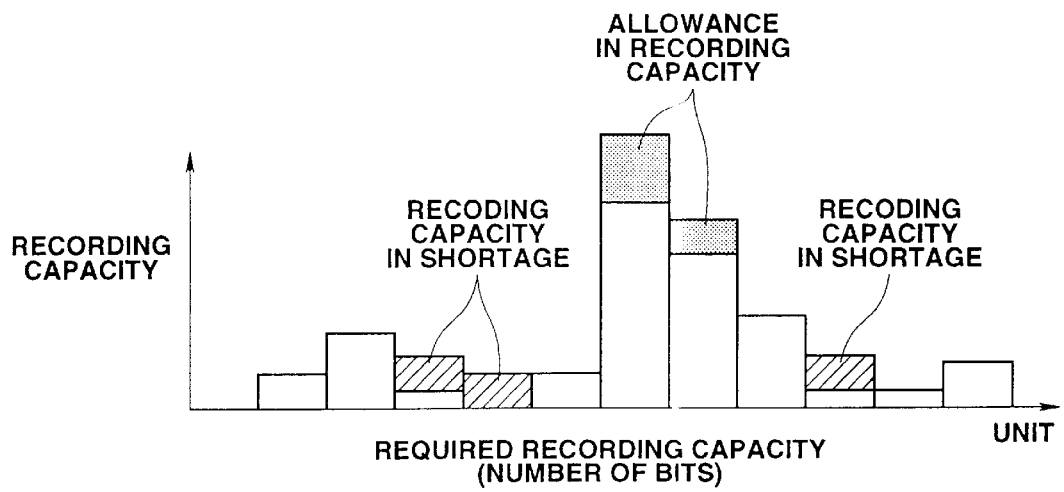
FIG. 23B is a graph showing another example of bit allocation between temporally different units in case bit allocation in a recording method in which the entire frequency spectrum is divided into plural sub-bands.
Figure 23C:
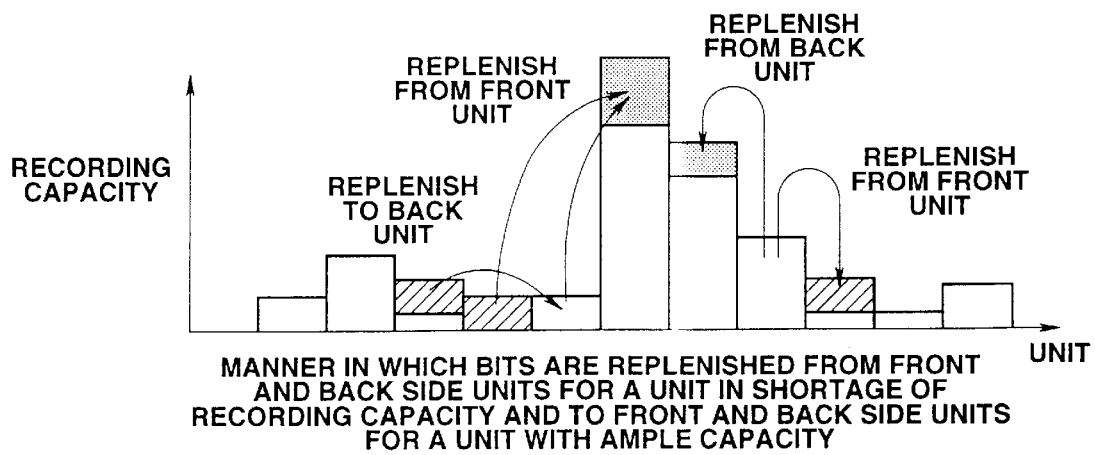
FIG. 23C is a graph showing still another example of bit allocation between temporally different units in case bit allocation in a recording method in which the entire frequency spectrum is divided into plural sub-bands.

That is, since the signal is changed with lapse of time, as shown in FIGS. 23A, 23B and 23C, some recording regions, in which the high-range signals and the difference information as the low-range noise reducing information, have ample bits, while other recording regions have only insufficient bits. For providing bit allocation as wasteless as possible, it is desirable to effect bit allocation between different units along the time axis.

The method of recording, transmitting and reproducing a sub-word divided from a digital word by dividing the entire frequency range into plural sub-bands has been described above and is not recited for clarity. However, the problems are raised with the present method as to the procurement of the recording capacity of the high-range signals and the low-range difference information.

Figure 24:
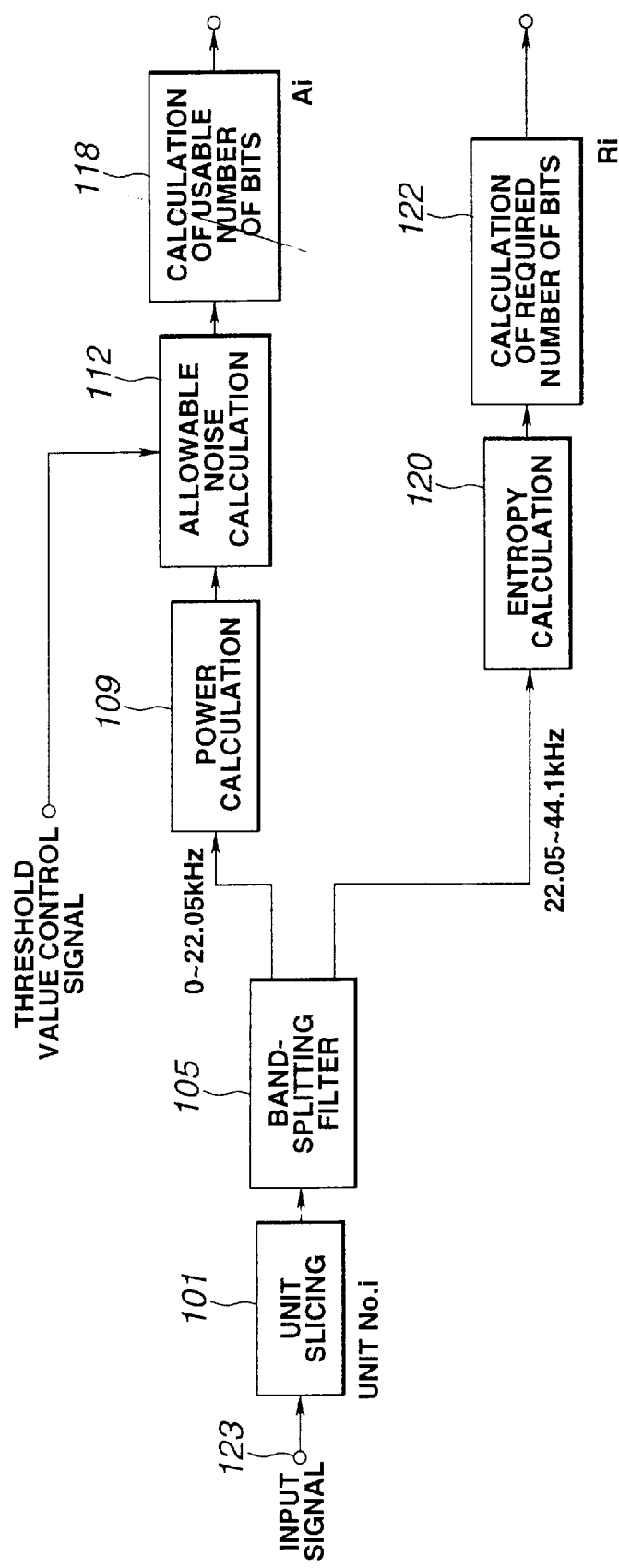
FIG. 24 is a block diagram showing another embodiment of an encoder (recording side) in case of splitting the entire frequency spectrum into two sub-bands.

FIG. 24 shows a method for calculating the bits of allocation for efficient bit allocation to each sub-word.

A digital signal, such as a speech or acoustic signal, is supplied to an input terminal 123. The sampling frequency for the compact disc is 44.1 kHz, while that for the present recording/reproducing device is 88.2 kHz. That is, the present recording/reproducing device is supplied with audio PDCM signals in a range of from 0 to 44.1 kHz. The digital signal entering the input terminal 123 is supplied to a unit slicing circuit 101.

The CD format has the frame construction as shown in FIG. 3. For entropy coding of high-range components, a larger number of samples is required as an input. Thus the unit slicing circuit 101 slices plural blocks, such as 48 blocks, as one unit, in consideration of real-time reproducing characteristics and for ease in data readout.

This input signal is supplied to a band-splitting filter 105 represented by the above QMF. The input signals entering the band-splitting filter 105 is split by the QMF into the above-mentioned low range of 0 to 22.05 kHz and the high range of from 22.05 kHz to 44.1 kHz. The low-range signals and the high-range signals are fed to a parity calculating circuit 109 and to the entropy calculating circuit 120, respectively.

The processing of low-range and high-range signals is explained.

The low-range signals are straight PCM data. Perceptually redundant signal components in the low-range signals are found and high-range signals are superimposed on these redundant signal components. The power calculating circuit 9 first calculates the power of the input low-range signals. There are two methods for word division. The first method is to divide the word in accordance with the sample-based power, as shown in FIG. 25A. The second method is to divide the word on an average in accordance with the unit-based power, as shown in FIG. 25B. With these methods, the sample-based or unit-based power is found, and an allowance value specifying to which extent the white noise level is perceptually allowable, that is to which level deterioration caused by noise mixing is not perceived, is calculated. That is, an output of the power calculating circuit 109 is supplied to the allowable noise calculating circuit 112, which then calculates the allowable noise in dependence upon the input power. The relation of the input signal power versus the allowable white noise is controlled by the allowable noise threshold value signal. The threshold signal is a signal supplied from a comparator 129 of FIG. 28 and controls the allowable noise volume calculating circuit 112 for increasing the allowable noise level in case the number of usable bits is significantly smaller than the required number of bits.

Figure 26A:
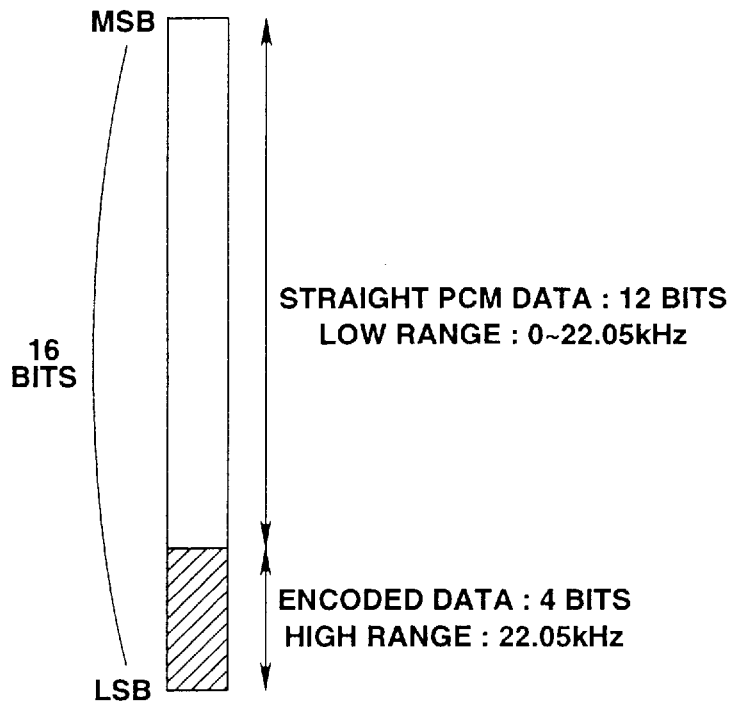
FIG. 26A illustrates how the waveform data is divided during recording between the MSB side and the LSB side in one word of digital signals.
Figure 26B:
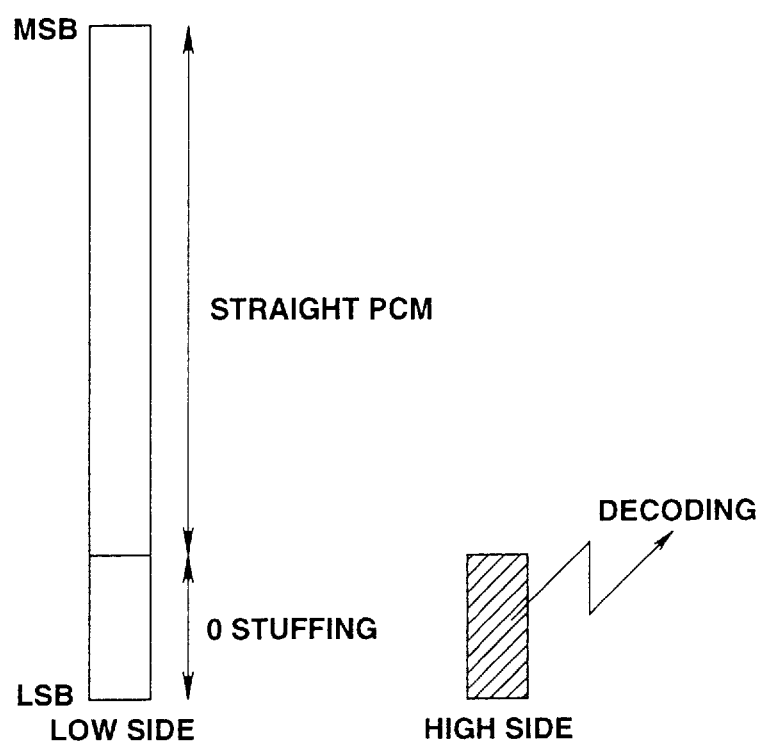
FIG. 26B illustrates how the recorded data is decoded during decoding as it is separated towards the low range and high range sides.

An output of the allowable noise volume calculating circuit 112 is supplied to a usable number of bits calculating circuit 118 which then calculates the maximum allowable number of bits (word length) Ai, where i is a number of units, for which the noise mixed into the LSB side of a word is not perceived by the hearer. The number of quantization bits for the compact disc is 16, with the dynamic range being about 98 dB. For example, if the signal level is 0 dB (16 bit fullscale), and the white noise up to a maximum value of −74 dB is allowable, the noise up to 4 bits is not audible to the hearer if 1 bit corresponds to about 6 dB. Thus, as shown in FIGS. 26A and 26B, 12 bits and 4 bits are allocated to the MSB side and the LSB side of the 16-bit word length, respectively. This divides a word to be divided in the time domain into two portions.

In the present embodiment, since the sub-word is found by division of the time-domain signals, the number of usable bits is calculated in the time-domain signals. However, sub-word division may also be performed on the frequency-domain signals, as will be explained by referring to FIG. 27.

The low-range signals divided by the band-splitting filter 106 are fed to an FFT circuit 124. For converting the time-domain waveform signals into frequency-domain spectral signals, the FFT circuit 124 applies e.g., the Humming window to the input low-range signals before executing Fourier transform (FFT). The FFT operation is carried out by inserting "0"s in a portion of the input low-range signal devoid of input data.

An output of the FFT circuit 124 is supplied to the allowable noise volume calculating circuit 14. The allowable noise volume calculating circuit 14 divides the spectrum as found by the FFT circuit 124 on the critical band basis and finds the allowable noise volume for each critical band for taking the so-called masking effect into account.

Similarly to the masking threshold value circuit 19 shown in FIG. 4, the allowable noise volume calculating circuit 114 explained with reference to FIGS. 5 to 7 may be employed.

The usable number of bits calculating circuit 119 calculates the maximum allowable number of bits Ai of a size corresponding to the allowable noise spectrum, that is the spectrum allocatable to the high frequency range.

The high range signal processing obtained on band splitting as shown in FIG. 24 is explained. The high-range signals from the band-splitting filter 120 is supplied to an entropy calculating circuit 120. The entropy calculating circuit 120 calculates the entropy in each unit. The meaning of finding the entropy resides in that the code length of the encoded signal can be estimated in case of carrying out entropy coding including Huffman coding thought to be among the most effective means for high-efficiency coding of the high-range signals. The entropy is calculated as follows:

The entropy may be found by the following equation (2):

$$H = -\sum_{j=1}^{m} p^i \log_2 p^i \qquad (2)$$

after finding the probability of occurrence $p^i$ for the respective information source symbols of the information sources desired to be encoded. In the above equation, m is the number of information sources. When the entropy is found in this manner, the mean code length L of the information source is given by the equation (3):

$$L \leq H \tag{3}$$

For example, if there are 8-bit data, and a signal in a two's complement representation can assume values of from −128 to 127, the probability of occurrence $p^i$ is found for a domain n. The entropy is found by setting M=256 in the above equation (2). However, since the logarithmic calculations cannot be done for the probability of occurrence $p^i$ is zero. Thus, $p^{i \log} p^i$ is set to zero for calculations.

The entropy thus found in the entropy calculating circuit 120 is supplied to a required number of bits calculating circuit 122. The required number of bits calculating circuit 122 finds the total number of bits Ri required for recording high-range signals of the unit. The equation for finding the required number of bits Ri is:

$$Ri=[N \times H^i] \tag{4}$$

where [N] denotes the minimum integer not smaller than N.

In this manner, the number of usable bits Ai and the required number of bits Ri are found over the entire units from one unit to another. The number of usable bits Ai and the required number of bits Ri are supplied to a usable number of bits summing circuit 127 and a required number of bits summing circuit 128, respectively. The usable number of bits summing circuit 127 and the required number of bits summing circuit 128 calculate a sum SA of the numbers of usable bits Ai and a sum SR of the required numbers of bits Ri, respectively.

The sums of the numbers of bits SA, SR, thus found by the usable number of bits summing circuit 127 and the required number of bits summing circuit 128, are supplied to a comparator 129 so as to be compared to each other. If the sum SA of the usable numbers of bits is significantly smaller than the sum SR of the required numbers of bits, it is necessary to increase the allowable noise volume to increase the number of usable bits in order to increase the capacity for recording the high frequency range signals. The comparator 129 then generates a threshold value control signal and transmits the generated signal to an allowable noise volume calculating circuit 113. The allowable noise volume calculating circuit 113 re-calculates the allowable noise volume based upon the threshold value control signal transmitted thereto. Conversely, if the sum SA of the usable numbers of bits is significantly larger than the sum SR of the required numbers of bits, it is unnecessary to provide a larger capacity for high-range recording, so that, in such case, the allowable noise volume is decreased. Thus the comparator circuit 129 similarly generates a threshold value control signal which is sent to the allowable noise volume calculating circuit 113. The allowable noise volume calculating circuit re-calculates the allowable noise volume based upon the threshold value control signal supplied thereto. This processing, however, is not required if, for finding the usable number of bits, the allowable noise volume is diminished and gradually increased for not increasing the sound quality deterioration in the low-range side as much as possible.

The sum of the numbers of bits SR as found by the required number of bits summing circuit 128 is supplied to a required bit number ratio calculating circuit 130. The required bit number ratio calculating circuit 130 calculates, from the SR value, the ratios of the numbers of bits that can be allocated to respective units by the following equation (5):

$$RR^i = R^i / SR \tag{5}$$

The bit number ratio RRi as found by the required bit number ratio calculating circuit 130 and an output of the comparator circuit 129 (sum of the numbers of required bits SA) are supplied to a bit allocation calculating circuit 131, which then calculates the allocated bit number for the unit from the SA and RRi values in accordance with the following equation (6):

$$AS^i = RR^i \times SA \tag{6}$$

The allocated bit number $AS^i$ as found by the bit allocation calculating circuit 131 is utilized as an upper limit of the bit number sum in each unit on high efficiency encoding the high-range signals.

The threshold value control signal, the number of usable bits $A^i$ and the bit allocation number $AS^i$, thus found, need to be recorded on the recording medium so as to be used for word splitting for recording/reproduction. These signals are allocated to and recorded on the subcodes R to W which, while being occasionally used as graphics data, are usually not used in the format.

Although the block length of each unit is made variable in the instant embodiment, the block length of each unit may be made variable if the unvoiced portion persists. In such case, more efficient recording may be realized by such encoding in which a block length with the lowest entropy is set so as to be a unit length. In this case, the unit length needs to be recorded and transmitted by being allocated within sub-code.

The above explanation has been made in connection with the processing of high-range signals obtained on band-splitting the time-domain signals shown in FIG. 24. The processing of FIG. 27 of high-range signals obtained on band-splitting the frequency-domain signals may be made in a similar manner and hence is not described for clarity.

Figure 27:
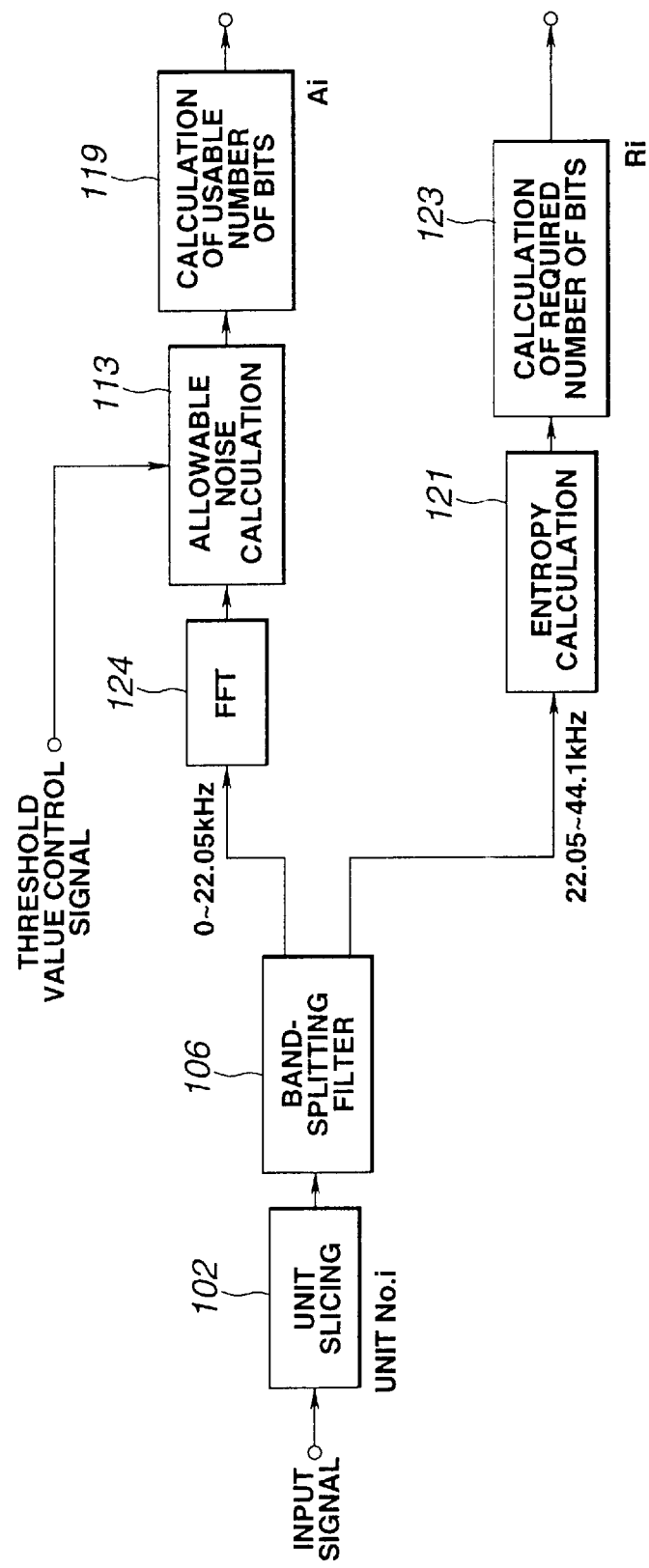
FIG. 27 is a block diagram showing still another embodiment of an encoder (recording side) in case of splitting the entire frequency spectrum into two sub-bands.

An embodiment of an encoder (recording side) and a decoder (reproducing side) employing splitting along time axis, as shown in FIG. 24, and an embodiment of an encoder (recording side) and a decoder (reproducing side) employing splitting along frequency axis, as shown in FIG. 27, will now be explained. In these embodiments, the input signal is divided into two bands, namely a low-range band and a high-range band.

Figure 29:
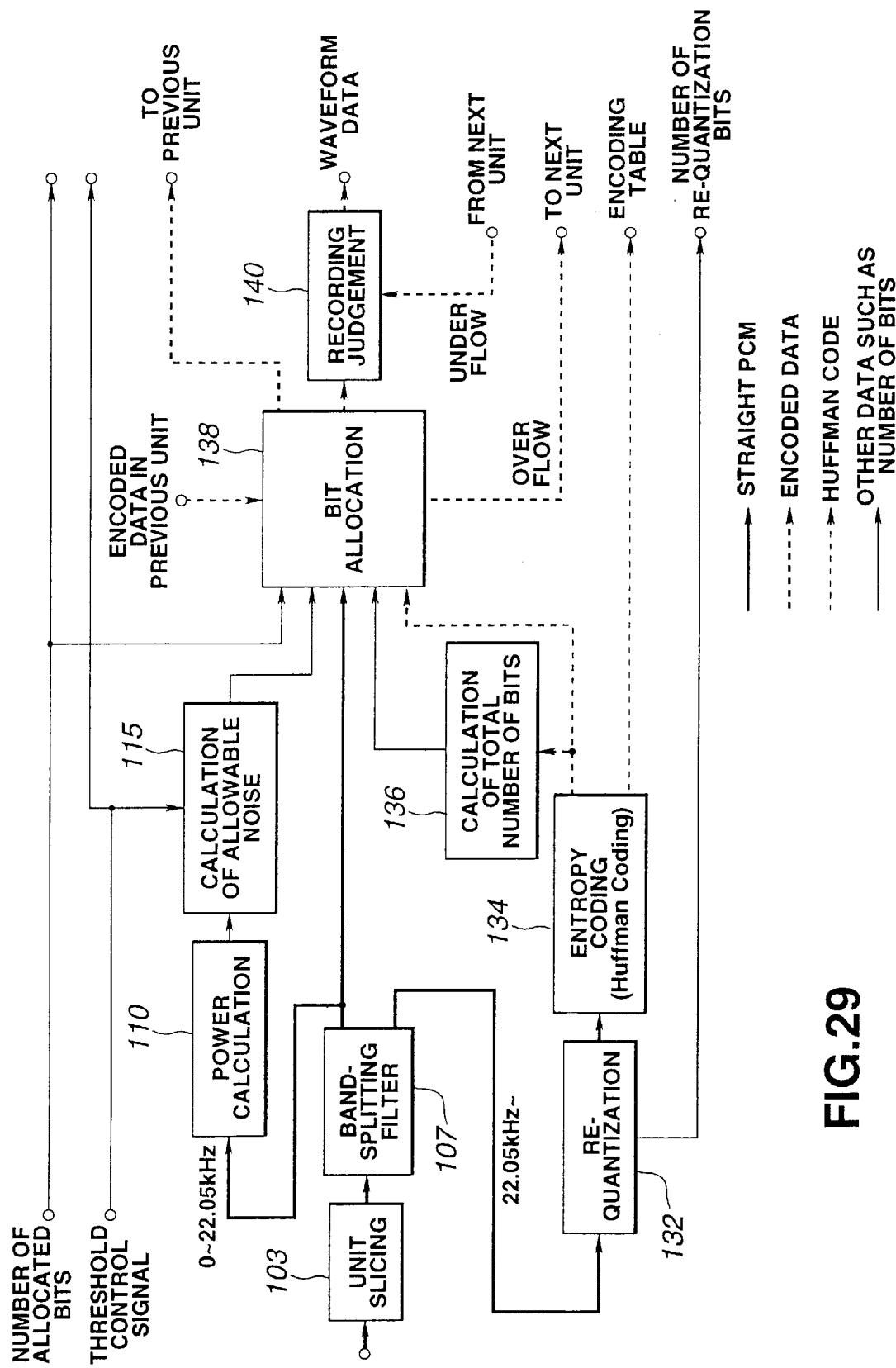
FIG. 29 is a block diagram showing a typical constitution of an encoder (recording side) employing the method of word division along time axis shown in FIG. 24.
Figure 30:
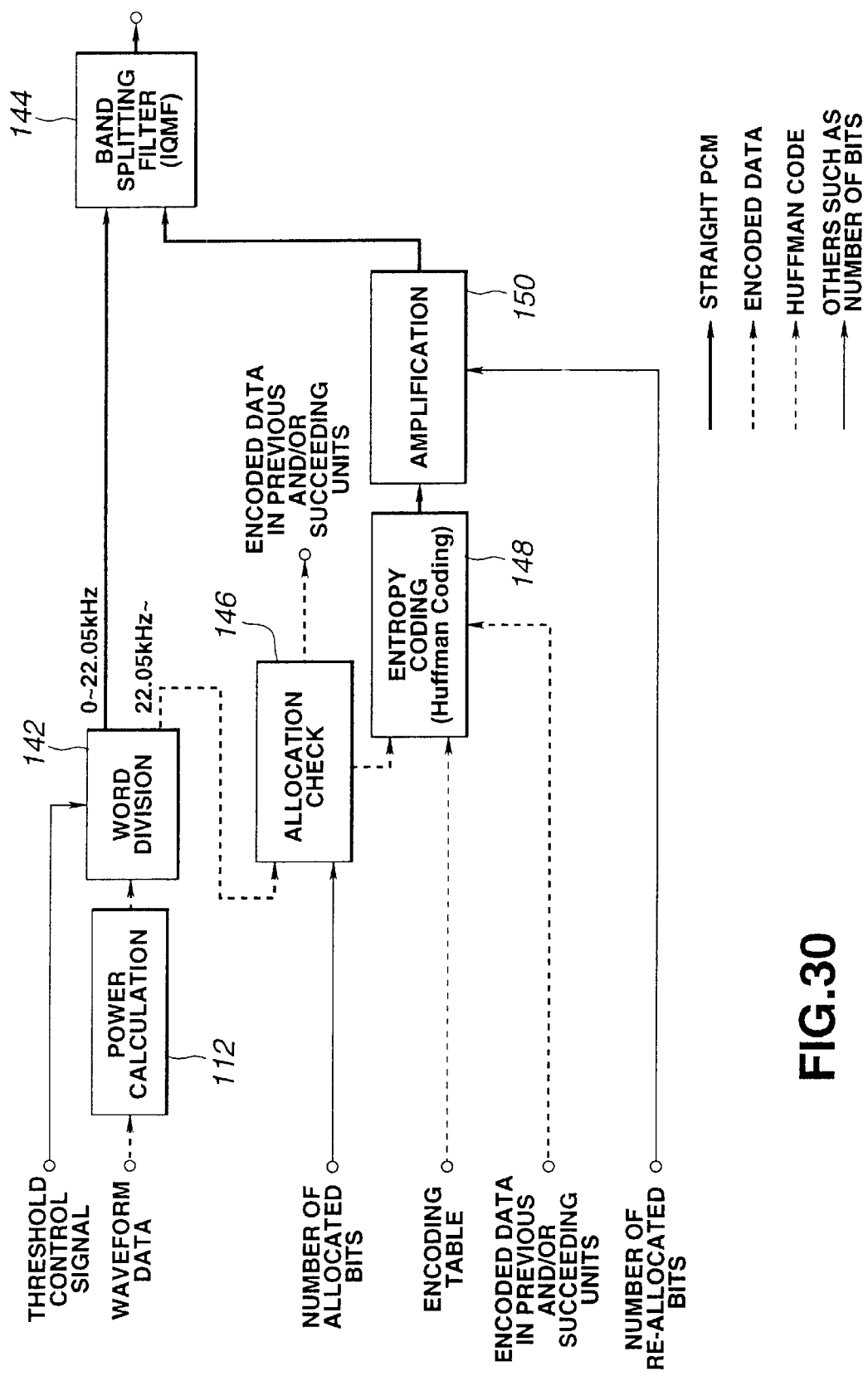
FIG. 30 is a block diagram showing a typical constitution of a decoder (reproducing side) employing the method of word division along time axis shown in FIG. 24.

FIG. 29 is a block diagram showing an embodiment of an encoder (recording side) employing splitting along time axis, while FIG. 30 is a block diagram showing an embodiment of a decoder (reproducing side) employing splitting along time axis. First, the encoder (recording side) is explained by referring to FIG. 29.

In this figure, an input signal is supplied to a unit slicing circuit 103, which then slices several blocks as one unit. An output of the unit slicing circuit 103 is supplied to a band-splitting filter 107. The band-splitting filter 107 is comprised of e.g., QMFs for splitting the input signal into low-range signals and high-range signals.

Figure 28:
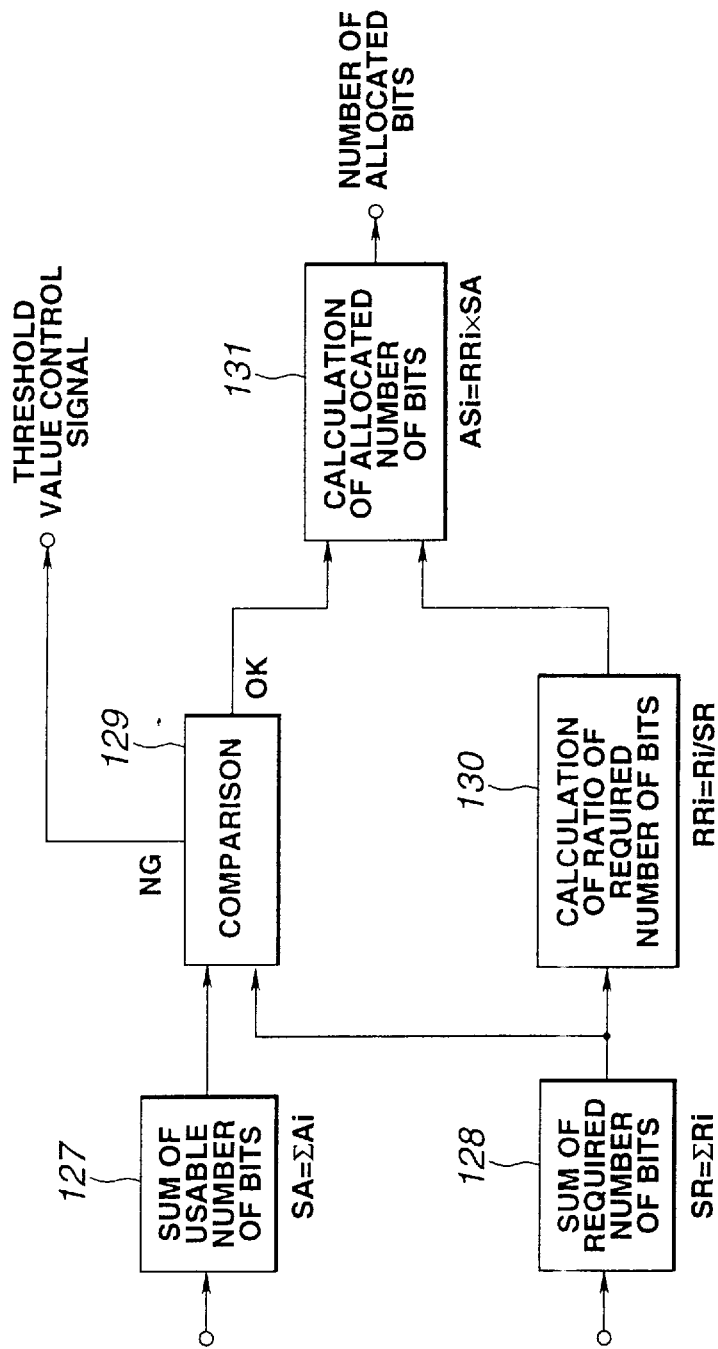
FIG. 28 is a block diagram for illustrating the method for finding the number of allocated bits in a given unit from the number of bits required for a sub-band.

The low-range signals from the band-splitting filter 107 are sequentially supplied to a power calculating circuit 110 and an allowable noise volume calculating circuit 115. The processing of the low-range signals obtained on band splitting is similar to the processing described in connection with FIG. 24. That is, the power calculating circuit 110 calculates the power of the input low-range signals. An output of the power calculating circuit 110 is supplied to the allowable noise volume calculating circuit 115 which then calculates the allowable noise volume based upon the power found by the power calculating circuit 110. The power calculating circuit 115 accordingly decides at which point a digital word is to be divided. The allowable noise volume calculating circuit 115 is controlled by a threshold value control signal previously found as illustrated in FIGS. 24 and 28.

On the other hand, the high-range signals from the band-splitting filter 107 are supplied to a re-quantization circuit 132. Since the high-range signals are generally lower in signal level than the low-range signals, the re-quantization circuit 132 re-quantizes the input high-range signals with a number of bits smaller than 16, which is the number for the compact disc, such as 8 bits, for diminishing the information volume of the straight PCM data. The number of re-quantization bits is allocated to a subcode which is usually not in use. The re-quantized data from the re-quantization circuit 132 is supplied to an entropy encoding circuit 34, which then encodes the re-quantization bits by encoding techniques such as Huffman coding. The entropy coding is done based upon the code table adapted for allocating codes associated with respective sample values. With this code table, formulated on the unit basis, the frequency of occurrence of respective samples in each unit is calculated and a code of shorter length is allocated to a sample value having a higher frequency of occurrence. The code table is allocated in separation from waveform data, to a sub-code in the CD format which is usually not in use. The encoded data from the entropy encoding circuit 134 is supplied to a total bit number calculating circuit 136. The total bit number calculating circuit 136 calculates to which number of bits the high-range signals have been compressed by entropy encoding.

To a bit re-allocation circuit 138 are supplied low-range signals from the band-splitting filter 107 (straight PCM data), an output of the allowable noise volume calculating circuit 115, encoded data from the entropy encoding circuit 134, an output of the total bit number calculating circuit 136 and the number of allocated bits. The bit re-allocation circuit 138 splits a low-range word based upon the allowable noise volume from the allowable noise volume calculating circuit 115 and allocates the high-range data to the LSB side of the word. At this time, the bit re-allocation circuit 138 confirms the recording capacity based upon the total bit number and the allocated bit number previously found as described in connection with FIGS. 24 and 28. If the total bit number exceeds the allocated bit number (overflow), all encoded data cannot be allocated. Thus the bit re-allocation circuit 138 carries over the overflowing encoded data to the next unit. Thus the bit re-allocation circuit 38 is occasionally fed with encoded data of the previous unit. If the total bit number is lesser than the allocated bit number (underflow), there is allowance in the allocation capacity. In such case, a recording judgment circuit 140 occasionally accepts encoded data from the next unit. That is, the recording judgment circuit 140 temporarily stores input data in a buffer and adds the data from the next unit from the bit re-allocation circuit 140 to the stored data for outputting the resulting data as waveform data.

The allocation bit number, threshold value control signal, encoding table or the re-quantization data are supplied to a subcode generating circuit, which is not shown in FIG. 29 but is shown in FIG. 12, so as to be allocated to a pre-set subcode area.

If the limit number of bits allocatable to the low frequency range is reached, the encoder (recording side) outputs the data for recording on the compact disc.

The decoder (reproducing side) is explained by referring to FIG. 30.

The waveform data is supplied to the power calculating circuit 112 which then calculates the signal power of the input waveform data on the sample basis or unit basis if the data has been recorded on the sample basis or on the unit basis, respectively. The power calculating circuit 112 calculates how many bits on the LSB side have been expended during recording for the high-range signals. The allocation bit number, threshold value control signal, encoding table and the number of re-quantization bits are resolved from the sub-code by a sub-code resolving circuit which is not shown in FIG. 30 but is shown in FIG. 16. A word splitting circuit 142 splits a word with the number of bits found responsive to the power from the power calculating circuit 112. A MSB side word and a LSB side word, produced on word splitting, are used as low-range side data and as high-range side data, respectively. The low-range data of the split word is directly sent as 16-bit straight PCM data to the band-synthesis filter 44. The LSB portion of the low-range data, employed for the high range side on word splitting, is stuffed with zeros, as shown in FIG. 26. Alternatively, linear interpolation or interpolation by a digital filter is applied for approximation to original signals for diminishing sound quality deterioration in the low range side. The high-range side signals are supplied to an allocation check circuit 146. The allocation check circuit 146 checks from the allocated bit number if encoded data in the current unit is or is not contained in the previous unit and/or in the succeeding unit or if the encoded data of the previous unit and/or the succeeding unit is or is not contained in the current unit. The encoded data is fed to an entropy decoding circuit 148. The entropy decoding circuit 148 reads out the encoded table recorded in the subcode at the time of entropy encoding and decodes the encoded data into straight PCM data. If, from the results of check by the allocation check circuit 146, the encoded data of the current unit is contained in the previous unit and/or the succeeding unit, required encoded data is supplied from the allocation check circuit to the entropy decoding circuit 148. That is, if the encoded data of the current unit is contained in the previous unit, the encoded data of the current unit, contained in the previous unit, is temporarily stored in the allocation check circuit 146 so that the stored data will be supplied to and decoded by the entropy decoding circuit 148 when the data is to be in use in the entropy decoding circuit 148. On the other hand, if encoded data of the current unit is contained in the succeeding unit, the encoded data of the current unit is temporarily stored in the entropy decoding circuit 148, so that, when the encoded data of the current unit, contained in the succeeding unit, is supplied from the allocation check circuit 146 to the entropy decoding circuit 148, the entropy decoding circuit 148 decodes the encoded data. If the encoded data of the current unit is contained in both the previous and succeeding units, both of the above operations are executed simultaneously.

The decoded data from the entropy decoding circuit 148 are supplied to an amplifier 150. Since the straight PCM data, decoded by the entropy decoding circuit 148, is the re-quantized data, it is smaller in amplitude than the original data. Thus the amplifier 150 de-quantizes the decoded data, based upon the number of re-quantization bits allocated to the sub-code for restoring 16-bit data which is then supplied to the band-synthesizing filter 44. The band-synthesizing filter 44 is exemplified by an IQMF and synthesizes the low and high range signals together. This filter is an interpolation filter and synthesizes signals containing one-half number of samples as a result of decimation in order to restore the original number of samples. Although a filter other than an IQMF may be employed as the band-synthesizing filter, it is necessary to use the IQMF if the QMF is used for band splitting since the band synthesizing filter is to be a counterpart of the band-splitting filter.

In the embodiments of FIGS. 29 and 30, the encoding table for entropy coding is formulated from unit to unit and allocated to a subcode. Alternatively, the encoding table is previously stored in each of ROMs laid in store on the recording and reproducing sides so that the encoding table is read from these ROMs for encoding and decoding. This alternative method is advantageous in that there is no necessity of recording a large number of the encoding tables in the subcode, the capacity for the encoding table scarcely falls in shortage on reducing the unit size and subcode readout error is not likely to be produced since only the code specifying the table employed is allocated to the subcode. In addition, since the number of bits used for re-quantization of high-range data may be known from the information as to which encoding table has been used, there is no necessity of recording the number of re-quantization bits in contradistinction from the embodiments shown in FIGS. 29 and 30.

An embodiment employing splitting along the frequency axis shown in FIG. 27 is explained.

Figure 31:
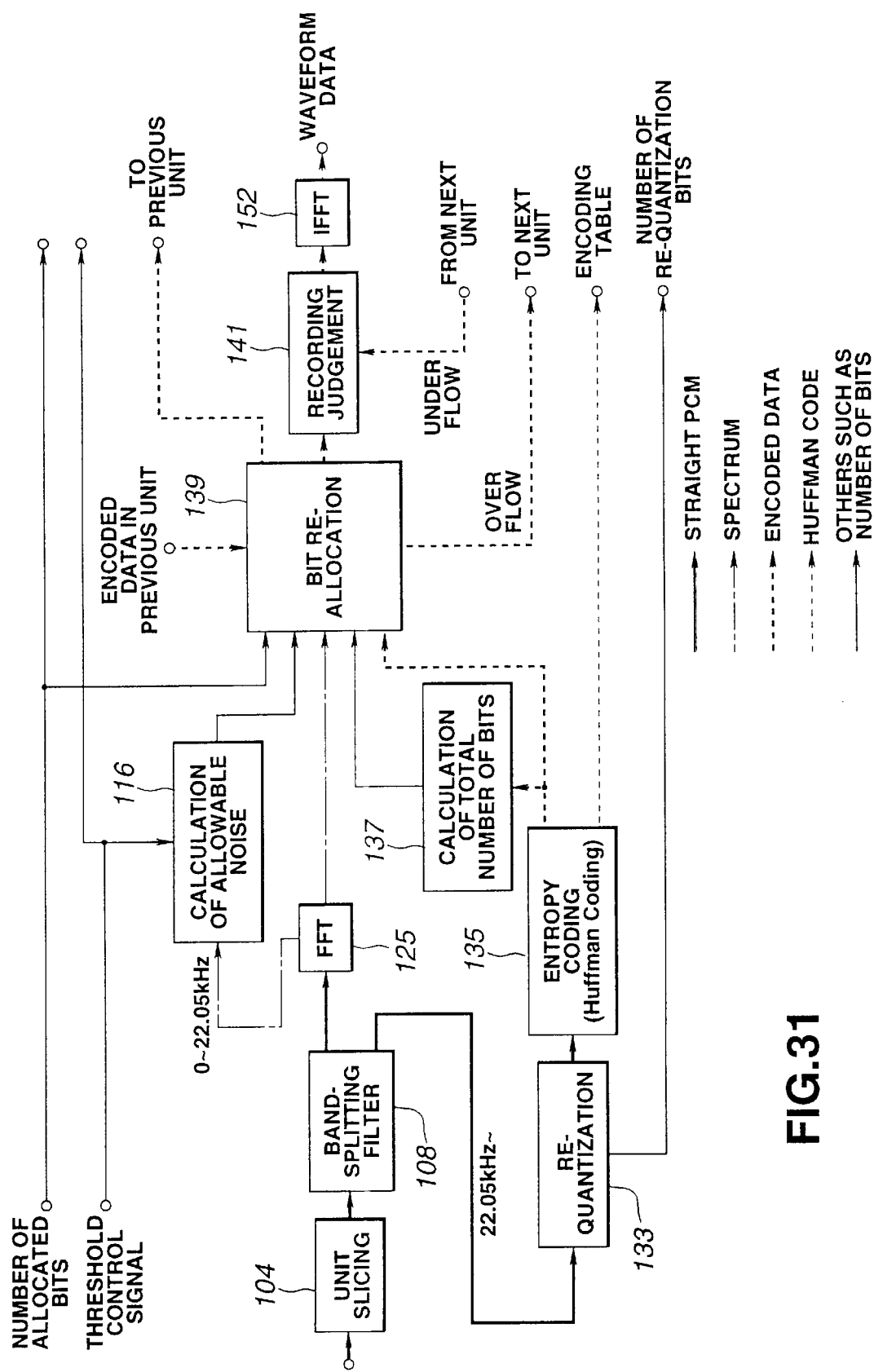
FIG. 31 is a block diagram showing a typical constitution of an encoder (recording side) employing the method of word division along frequency axis shown in FIG. 27.
Figure 32:
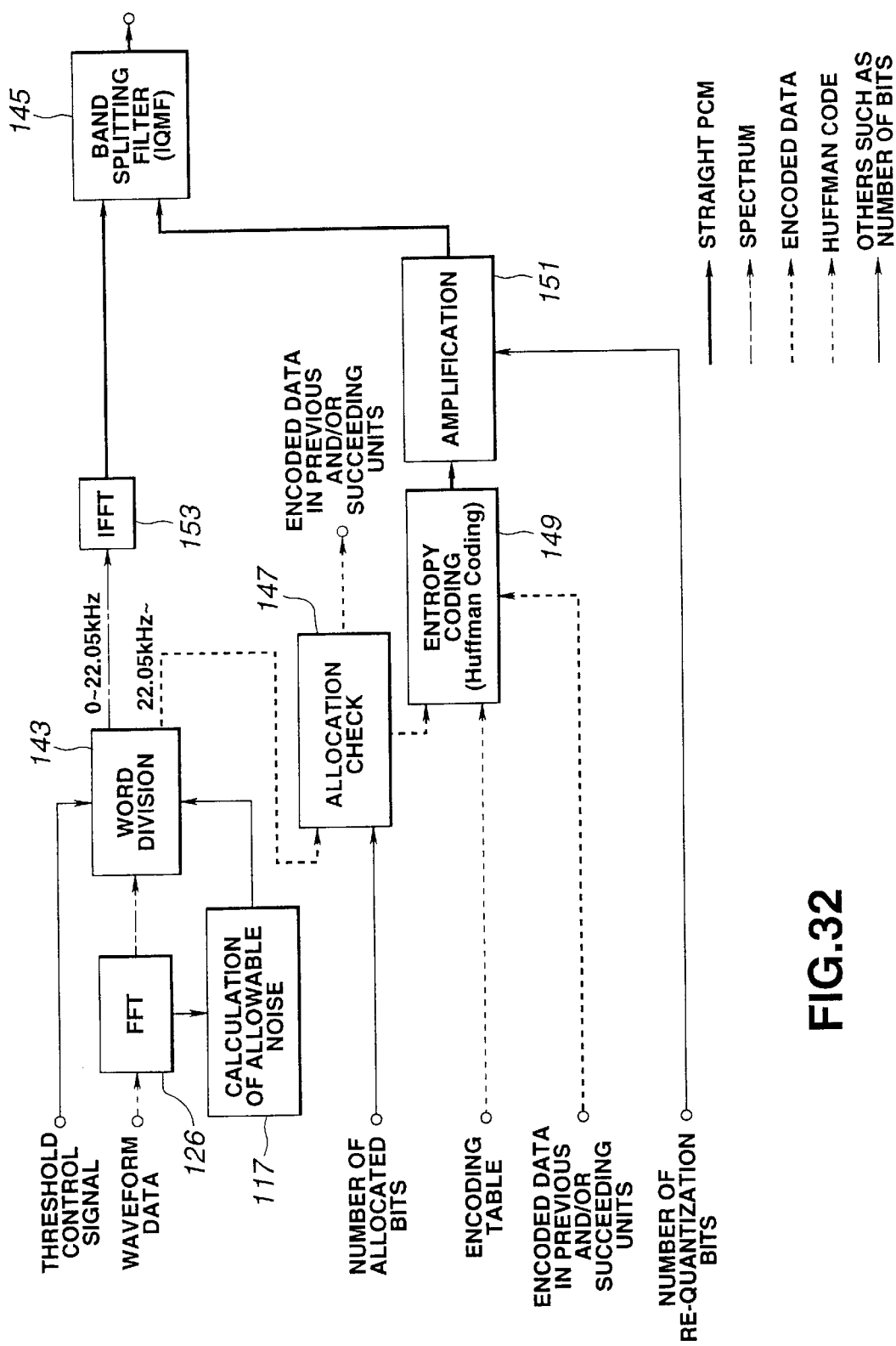
FIG. 32 is a block diagram showing a typical constitution of a decoder (reproducing side) employing the method of word division along frequency axis shown in FIG. 27.

FIG. 31 is a block diagram showing an embodiment of an encoder (recording side) employing splitting along the frequency axis, and FIG. 32 is a block diagram showing an embodiment of an decoder (reproducing side) employing splitting along the frequency axis.

In FIGS. 31 and 32, showing the encoder (recording side) and the decoder (reproducing side), respectively, the following portions differ from those shown in FIGS. 29 and 30, with the remaining portions being similar to those of FIGS. 29 and 30. In the encoder (recording side), the low-range signals from a band-splitting filter 108 are supplied to a FFT circuit 125 which then converts the low-range signals into spectral signals on the frequency axis. An allowable noise volume calculating circuit 116 splits the frequency spectrum into critical bands and calculates the allowable noise volume from one critical band to another. Ultimately, data from the recording judgment circuit is supplied to an IFFT circuit 152 which then transforms the frequency-domain data into time-domain waveform data. In the decoder (reproducing side), the input signal is converted into spectral signals on the frequency axis by the FFT circuit 126 upstream of a word-splitting circuit 143. The allowable noise volume is found by an allowable noise volume calculating circuit 117. The word splitting circuit 143 splits the frequency spectrum from the FFT circuit 126 into words. On the other hand, the frequency-domain data is converted into time-domain waveform data by an IFFT circuit 152 upstream of the band synthesizing circuit.

The instant embodiment differs from the embodiment of FIGS. 29 and 30 and is otherwise similar thereto so that the common portions are not explained herein for clarity. However, if FFT is to be performed in the instant embodiment, data zero is stuffed if the unit length is not up to 2n and redundant data needs to be cut off on the occasion of IFFT.

Although entropy coding is to be performed as a method for information compression of high-range signals, recording can also be made by linear predictive coding (LPC). The linear predictive coding (LPC) is based upon the concept that the speech waveform is related with past several samples and states that a sample value of a discrete time-domain samples of the speech $s^1$, $s^2$, . . . at a certain time point is a linear coupling of past p data and may be approximated by $$S_n = \sum_{k=1}^{p} a^k S_{n-k} \qquad (7)$$

where the coupling coefficient $a^k$ is a linear prediction coefficient, p is a number of orders of prediction and an error $e^n$ between a real value and an approximate value is a prediction residual. If prediction by LPC is successful, the residual power becomes small so that transmission may be made with a low bit rate. For decoding, if a filter by linear prediction coefficients is generated and the residual is entered, the original waveform may be restored by the following equation (8):

$$S_n = e^n + \sum_{k=1}^{p} a^k S_{n-k} \qquad (8)$$

As a method for allocating high-range signals, non-linear quantization inclusive of ADPCM, vector quantization or a method consisting in finding perceptual information on the frequency axis for finding masking or the like for achieving high efficiency encoding may also be used in addition to entropy coding or LPC. The codes obtained by the above methods may further be encoded by entropy coding.

In any of the above embodiments, processing is executed on the unit basis and hence cannot be coped with if the readout speed with a conventional recording medium for reproduction is used, thus producing data time delay. For solving this, data is read out at a rate faster than the conventional readout velocity for the recording medium. In the case of a compact disc, it is rotated at double the usual readout velocity for reading out the data. The data thus read out from the disc is processed at the same time as it is reproduced.

Although the above description has been made with reference to the compact disc, the present invention may be applied to a digital audio package medium for DAT or a transmission system, such as broadcasting. In addition, the present invention may be utilized not only for audio signals but also for video signals.

It is seen from above that the digital signal processing method according to the present invention is such a method in which the entire frequency band of the input digital signal is split into plural sub-bands which are allocated to plural sub-words divided from a word of the input digital signal, and in which the information for diminishing the noise in at least one of the sub-bands is allocated to a sub-word allocated to a sub-band other than the sub-band whose noise is to be reduced. Thus it becomes possible to reduce the noise in the sub-band to be recorded or transmitted in order to realize the sound quality proper to the word length of the original signal. Thus it becomes possible to compress the information volume in its entirety to record the information for the high range while maintaining the quality of the low-range signals.

That is, in accordance with the present invention, the quantization noise generated by allocating the usual reproducing band to straight PCM signals with a word length shorter than the usual straight PCM word resulting from splitting the usual straight PCM word is to be reduced. As the information for reducing the quantization noise, the difference between the straight PCM signal having the conventional word length and the straight PCM signal having the reduced word length may be employed.

Thus, by allocating a sub-word to this difference signal, it becomes possible to prohibit deterioration of the signal quality in the quantization noise. However, recording the difference signal itself is in no way different from recording the conventional word length insofar as the information volume is concerned, so that it becomes impossible to record signals in excess of the usual bandwidth.

If the input digital signal is an audio signal, the psychoacoustic characteristics of the human auditory system are exploited in order to take out only the signal components thought to deteriorate the signal quality for securing an area for recording the signals in excess of the usual band. These signal components are recorded by allocating a sub-word separate from the signal in excess of the usual band or by combining the signal components with the signals in excess of the usual reproducing band. For recording, the signal portion of the straight PCM data, taken out by exploiting the psychoacoustic characteristics and thought to affect the sound quality, cannot be recorded within the conventional recording capacity, so that it is compressed in signal volume by high efficiency encoding prior to recording.

Thus it is possible with the above method to reduce the noise in the band portion recorded with the straight PCM signals to realize the sound quality equivalent to that achieved with the original PCM word. Thus it becomes possible to record the high-range information as well as to maintain the sound quality for the low-range side.

Thus, in accordance with the present invention, the signal having a band twice the reproducing band may be reproduced while the recording capacity of the conventional recording medium is maintained. By splitting the frequency spectrum and by recording the low-range portion with straight PCM signals, the usual reproducing band can be reproduced with a conventional reproducing device, while it is unnecessary to provide separate recording media for the conventional reproducing device and the inventive reproducing device. If, with the conventional reproducing device, data is read out from the recording medium for taking out the bitstream, the high-range portion may be reproduced by addition only of the signal processing portion processed of the reproducing device of the present invention.

The present invention is not to be limited to the illustrative embodiments described since the present invention may be modified in many respects within the purport of the invention as defined by the appended claims.

What is claimed is:

1. A digital signal processing method for processing a signal obtained on splitting an entire frequency band of an input digital signal into a plurality of sub-bands, comprising the steps of:
dividing the entire frequency band of the input digital signal into the plurality of sub-bands; and
allocating signals of each sub-band to a plurality of sub-words divided from a word of the input digital signal;
wherein, in said allocating step, information for reducing noise in at least one of the sub-bands is allocated to a sub-word different from a sub-word to which is allocated the signal of the sub-band whose noise is to be reduced.

2. The digital signal processing method as claimed in claim 1, wherein in said allocating step, the information for reducing the noise as well as the signal of the sub-band other than the sub-band whose noise is to be reduced is allocated to the sub-word to which is allocated the signal of the sub-band other than the sub-word whose noise is to be reduced.

3. The digital signal processing method as claimed in claim 2, wherein said allocating step allocates a fixed ratio of bits between the information for reducing the noise in said sub-word and the signal of the sub-band other than the sub-band whose noise is to be reduced.

4. The digital signal processing method as claimed in claim 2, wherein said allocating step allocates a fixed ratio of bits between the information for reducing the noise in said sub-signal and the signal of the sub-band other than the sub-band whose noise is to be reduced.

5. The digital signal processing method as claimed in claim 1, wherein said allocating step allocates a bit allocation which is a variable number of bits in the signals of each sub-band allocated to said plurality of sub-words.

6. The digital signal processing method as claimed in claim 5, wherein in said allocating step, the bit allocation is dynamically made in dependence upon the sub-band information and the information for reducing the noise.

7. The digital signal processing method as claimed in claim 5, wherein in said allocating step, a plurality of words of the input digital signal are grouped into a block and the bit allocation is made variable from block to block.

8. The digital signal processing method as claimed in claim 7, wherein in said allocating step, the block is variable length in dependence upon the sub-band information and the information for reducing the noise.

9. The digital signal processing method as claimed in claim 1, wherein difference information between a signal higher than a straight PCM bit rate in the signal of the sub-band whose noise is to be reduced and the signal other than the band whose noise is to be reduced is obtained and wherein, in said allocating step, the difference information is allocated to the sub-word different from the sub-word to which is allocated the signal of the band whose noise is to be reduced.

10. The digital signal processing method as claimed in claim 9, wherein the difference information is obtained from the signal of the sub-band whose noise is to be reduced and a signal of a straight PCM bit rate higher than that of the signal of the band whose noise is to be reduced.

11. The digital signal processing method as claimed in claim 10, wherein the difference information is encoded by high-efficiency encoding for reducing an information volume of the difference information.

12. The digital signal processing method as claimed in claim 11, wherein the difference information is encoded by exploiting perceptual information for reducing the information volume of the difference information.

13. The digital signal processing method as claimed in claim 11, wherein the difference information is encoded by entropy encoding for reducing the information volume of the difference information.

14. The digital signal processing method as claimed in claim 11, wherein the difference information is encoded by linear predictive coding for reducing the information volume of the difference information.

15. A method for decoding a signal split into a plurality of sub-bands into a digital signal whose noise has been reduced, comprising the steps of:
splitting, from each sub-word within the sub-bands, a signal of at least one sub-band whose noise is to be reduced and the information for reducing the noise in the sub-band whose noise is to be reduced; and
combining the information for reducing the noise and the signal of the sub-band whose noise is to be reduced to form the digital signal whose noise has been reduced.

16. A digital signal processing apparatus for processing a signal obtained on splitting an entire frequency band of an input digital signal into a plurality of sub-bands, comprising:
band-splitting means for splitting the entire frequency band of the input digital signal into the plurality of sub-bands; and
sub-band encoding means for allocating information for reducing the noise of at least one sub-band from the band splitting means to a sub-code different from a sub-code to which is allocated the signal of the sub-band whose noise is to be reduced.

17. The digital signal processing apparatus as claimed in claim 16, further comprising:

difference information generating means for producing difference information from a straight PCM signal of at least one of a plurality of sub-bands split by said band-splitting means and straight PCM signals of reduced word length of said sub-band for producing the information for reducing the noise.

18. The digital signal processing apparatus as claimed in claim 17, further comprising:

high-efficiency encoding means for encoding the difference information for reducing an information volume of the difference information.

19. The digital signal processing apparatus as claimed in claim 17, further comprising:

means for generating information indicating perceptually redundant components, and means for compressing the difference information based upon the information from said generating means for reducing an information volume of said difference information.

20. The digital signal processing apparatus as claimed in claim 17, further comprising:

means for encoding the difference information by entropy encoding for reducing an information volume of the difference information.

21. The digital signal processing apparatus as claimed in claim 17, further comprising:

means for encoding the difference information by linear predictive coding for reducing the information volume of the difference information.

22. A digital signal processing apparatus for processing a signal obtained on splitting an entire frequency band of an input digital signal into a plurality of sub-bands, comprising:

band-splitting means for splitting the entire frequency band of the input digital signal into the plurality of sub-bands; and sub-band encoding means for allocating signals of respective bands to a word comprising at least two sub-words, that is at least a first sub-word and a second sub-word, obtained on dividing a word of the input digital signal, wherein said sub-band encoding means allocates the signal of a sub-band whose noise is to be reduced to said first sub-word while allocating information for reducing the noise in the signal of the sub-band allocated to a pre-set subword to a sub-word different from said second sub-word.

23. The digital signal processing apparatus as claimed in claim 22, wherein said sub-band encoding means allocates the signal of the sub-band whose noise is to be reduced to said first sub-word disposed on a MSB side of the word while allocating the information for reducing the noise in the signal of the sub-band allocated to said first sub-word to a sub-code disposed on a LSB side of the word.

24. A digital signal decoding apparatus for decoding a digital signal from a signal split into a plurality of sub-bands, comprising:

means for splitting from a sub-word, said sub-word being obtained from splitting a word of a digital signal, a signal of at least one sub-band whose noise is to be reduced and information for reducing the noise in said at least one sub-band, wherein the information for reducing the noise in said at least one sub-band is allocated to a sub-word different from the sub-word to which is allocated the signal of the sub-band whose noise is to be reduced;

means for allocating signals of each sub-band to a plurality of sub-words; and means for synthesizing the information for reducing the noise and the signal of the sub-band whose noise is to be reduced.

25. A recording medium having recorded therein signals produced by a digital signal processing method designed for processing an input digital signal, said recording medium being prepared by the steps of:

splitting an entire frequency band of said input digital signal into a plurality of sub-bands;

allocating signals of each sub-band to a plurality of sub-words split from a word of the input digital signal, wherein the information for reducing the noise in at least one of said sub-bands is allocated to a sub-word different from the sub-word to which said sub-band is allocated; and recording the allocated signals on said recording medium.

26. A digital signal transmitting method for transmitting a signal obtained on splitting an entire frequency band of an input digital signal into a plurality of sub-bands, comprising the steps of:

splitting the entire frequency band of the input digital signal into a plurality of sub-bands; and allocating signals of each sub-band to a plurality of sub-words split from a word of the input digital signal;

wherein, in said allocating step, the information for reducing the noise in at least one of the sub-bands is allocated to a pre-set sub-word different from the sub-word to which has been allocated the signal of the sub-band whose noise is to be reduced; and wherein the signal of said at least one sub-band whose noise is to be reduced and the information for reducing the noise in said at least one sub-band are transmitted.

27. A digital signal processing method for processing a signal obtained on splitting an entire frequency band of an input digital signal into a plurality of sub-bands, and for allocating a plurality of sub-words divided from a word of the input digital signal, comprising the steps of:

forming a plurality of units, each unit having a plurality of blocks including a plurality of words of an input digital signal;

for at least one of said plurality of units, splitting an entire frequency band of a signal into a plurality of sub-bands; and allocating signals, where such allocation is one of allocating signals of at least one sub-band of each unit to sub-words of plural units, and allocating signals of at least one sub-band in each of said plurality of units to one sub-word, wherein information for reducing noise is allocated such that the information in at least one sub-band is allocated to sub-words of plural units, or the information in at least one sub-band in plural units is allocated to one sub-word.

28. The digital signal processing method as claimed in claim 27, wherein in said allocating step, sub-word length information in each sub-band is received and a sub-word length in each sub-band is fixedly allocated based upon the sub-word length information.

29. The digital signal processing method as claimed in claim 27, wherein in said allocating step, sub-word length information in each sub-band is received and a sub-word length in each sub-band is variably allocated based upon the sub-word length information.

30. The digital signal processing method as claimed in claim 27, wherein sub-word length information is received in said allocating step, and said sub-word length information is information obtained on increasing or decreasing a sub-word length allocated to a given sub-band in each block when a sum of sub-word lengths required for a given sub-band in each block is significantly smaller or larger than a sum of the sub-words allocated to said given sub-band.

31. The digital signal processing method as claimed in claim 27, wherein in said allocating step, a sub-word is allocated to a sub-band of each block based upon a sub-word length required for each sub-band previously found in all blocks.

32. A digital signal processing apparatus for processing a signal obtained on splitting an entire frequency band of an input digital signal into a plurality of sub-bands, and for allocating a plurality of sub-words divided from a word of the input digital signal, comprising:

means for forming a plurality of units, each unit having a plurality of blocks including a plurality of words of an input digital signal;

means for splitting an entire frequency band of a signal from said means for forming into a plurality of sub-bands; and means for allocating signals, where such allocation is one of allocating signals of at least one sub-band from said means for splitting to sub-words of plural units, and allocating signals of at least one sub-band in each of said plurality of units to one sub-word, wherein information for reducing noise is allocated such that the information in at least one sub-band is allocated to sub-words of ilural units, or the information in at least one sub-band in plural units is allocated to one sub-word.

33. A digital signal processing apparatus for processing a signal obtained on splitting an entire frequency band of an input digital signal into a plurality of sub-bands, and for allocating a plurality of sub-words divided from a word of the input digital signal, comprising:

means for forming a plurality of units, each unit having a plurality of blocks including a plurality of words of an input digital signal;

means for splitting an entire frequency band of a signal from said means for forming into at least low-range signals and high-range signals;

means for encoding said high-range signals with high-efficiency encoding for reducing the information volume of said high-range signals for reducing the noise in said low-range signals; and means for allocating, where such allocation is one of allocating the information from said encoding means for reducing the noise in said low-range signals to sub-words of said plurality of units, and allocating the information from said encoding means for reducing the noise in said low-range signals in said plurality of units to a sole sub-word.

34. A recording medium having recorded therein signals produced by a digital signal processing method designed for processing an input digital signal, said recording medium being prepared by the steps of:

splitting an entire frequency band of an input digital signal into a plurality of sub-bands for each of a plurality of units grouped from a plurality of blocks comprising a plurality of words of the input digital signal;

allocating signals of each sub-band to a plurality of sub-words split from a word of the input digital signal, wherein, when the signals of said sub-bands are allocated on the unit basis, such allocation is one of signals of at least one sub-band being allocated to sub-words of plural units, and signals of at least one sub-band in each of plural units being allocated to one sub-word, and wherein information for reducing noise is allocated such that the information in at least one sub-band is allocated to sub-words of plural units, or the information in at least one sub-band in plural units is allocated to one sub-word; and recording the allocated signals on said recording medium.

35. A digital signal transmitting method for transmitting a signal obtained on processing a signal obtained in turn on splitting an entire frequency band of an input digital signal into a plurality of sub-bands, and for allocating a plurality of sub-words divided from a word of the input digital signal, comprising the steps of:

means for forming a plurality of units, each unit having a plurality of blocks including a plurality of words of an input digital signal;

dividing an entire frequency band of a signal from said means for forming into a plurality of sub-bands from one unit to another;

allocating signals, where such allocation is one of allocating signals of at least one sub-band of each unit to sub-words of plural units, and allocating signals of at least one sub-band in each of plural units to one sub-word, wherein information for reducing noise is allocated such that the information in at least one sub-band is allocated to sub-words of plural units, or the information in at least one sub-band in plural units is allocated to one sub-word; and transmitting the allocated signals.

\* \* \* \* \*

UNITED STATES PATENT AND TRADEMARK OFFICE
CERTIFICATE OF CORRECTION

PATENT NO.: 5,864,800
DATED: January 26, 1999
INVENTOR(S): KENICHI IMAI ET AL.

It is certified that errors appear in the above-identified patent and that said Letters Patent is hereby corrected as shown below:

In Col. 25, line 65, "sub-signal" should be "sub-word".

In Col. 27, line 43, "subword" should be "sub-word".

In Col. 29, line 24, "ilural" should be "plural".

Signed and Sealed this

Fifteenth Day of June, 1999

Attest:

Q. TODD DICKINSON

*Attesting Officer*   *Acting Commissioner of Patents and Trademarks*